US011947275B2

(12) United States Patent
Iwasaki et al.

(10) Patent No.: US 11,947,275 B2
(45) Date of Patent: Apr. 2, 2024

(54) ELECTROPHOTOGRAPHIC APPARATUS

(71) Applicant: CANON KABUSHIKI KAISHA, Tokyo (JP)

(72) Inventors: Shuhei Iwasaki, Kanagawa (JP); Kaname Watariguchi, Kanagawa (JP); Akihiro Maruyama, Shizuoka (JP); Kenichi Kaku, Shizuoka (JP); Michiyo Sekiya, Shizuoka (JP); Kohei Makisumi, Shizuoka (JP); Tatsuya Yamaai, Kanagawa (JP); Hideharu Shimozawa, Tokyo (JP); Naoki Fukushima, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/168,736

(22) Filed: Feb. 14, 2023

(65) Prior Publication Data

US 2023/0288836 A1 Sep. 14, 2023

(30) Foreign Application Priority Data

Mar. 9, 2022 (JP) ................................. 2022-036569

(51) Int. Cl.
*G03G 15/02* (2006.01)
*G03G 5/06* (2006.01)
*G03G 5/10* (2006.01)

(52) U.S. Cl.
CPC ....... *G03G 15/0266* (2013.01); *G03G 5/0696* (2013.01); *G03G 5/102* (2013.01); *G03G 15/0216* (2013.01); *G03G 15/0283* (2013.01)

(58) Field of Classification Search
CPC ........... G03G 15/0283; G03G 15/0266; G03G 15/0216; G03G 5/0696; G03G 5/102
See application file for complete search history.

(56) References Cited

U.S. PATENT DOCUMENTS 7,045,261 B2 5/2006 Tanaka
7,141,341 B2 11/2006 Sekido
(Continued)

FOREIGN PATENT DOCUMENTS

JP 5-66638 A 3/1993
JP 5615004 B2 10/2014

OTHER PUBLICATIONS

U.S. Appl. No. 18/174,978, Hideharu Shimozawa, filed Feb. 27, 2023.
(Continued)

*Primary Examiner* — Joseph S Wong
(74) *Attorney, Agent, or Firm* — VENABLE LLP

(57) ABSTRACT

Provided is an electrophotographic apparatus including: an electrophotographic photosensitive member; a voltage application unit configured to cause discharge from an electroconductive member to the electrophotographic photosensitive member; a charge transfer amount detection unit configured to detect a charge transfer amount per unit time resulting from the discharge from the electroconductive member to the electrophotographic photosensitive member; and a charging potential control unit, wherein $V_1$ and $V_2$ defined by specific procedures for the electrophotographic photosensitive member satisfy a relationship represented by the following expression (E-4): $100V_1<V_2-V_1$ (E-4), and wherein the charging potential control unit is configured to control the charging potential of the electrophotographic photosensitive member at the time of image formation.

17 Claims, 3 Drawing Sheets

(56) References Cited

U.S. PATENT DOCUMENTS

| | | | | |
|---|---|---|---|---|
| 7,378,205 | B2 | 5/2008 | Sekiya | |
| 7,585,604 | B2 | 9/2009 | Ogaki | |
| 7,910,274 | B2 | 3/2011 | Tanaka | |
| 7,927,774 | B2 | 4/2011 | Ogaki | |
| 8,343,699 | B2 | 1/2013 | Nagasaka | |
| 8,465,889 | B2 | 6/2013 | Sekido | |
| 8,524,430 | B2 | 9/2013 | Takagi | |
| 8,546,050 | B2 | 10/2013 | Maruyama | |
| 8,632,931 | B2 | 1/2014 | Sekido | |
| 8,783,209 | B2 | 7/2014 | Kaku | |
| 8,795,936 | B2 | 8/2014 | Sekido | |
| 8,841,052 | B2 | 9/2014 | Watariguchi | |
| 8,974,991 | B2 | 3/2015 | Kawahara | |
| 9,029,054 | B2 | 5/2015 | Okuda | |
| 9,034,545 | B2 | 5/2015 | Maruyama | |
| 9,063,505 | B2 | 6/2015 | Sekiya | |
| 9,068,083 | B2 | 6/2015 | Tanaka | |
| 9,069,267 | B2 | 6/2015 | Kaku | |
| 9,235,144 | B2 | 1/2016 | Yamamoto | |
| 9,274,442 | B2 | 3/2016 | Sato | |
| 9,280,071 | B2 | 3/2016 | Maruyama | |
| 9,436,106 | B2 | 9/2016 | Kuno | |
| 9,436,107 | B2 | 9/2016 | Murakami | |
| 9,459,542 | B2 | 10/2016 | Tanaka | |
| 9,500,966 | B2 | 11/2016 | Watariguchi | |
| 9,507,283 | B2 | 11/2016 | Maruyama | |
| 9,523,929 | B2 | 12/2016 | Nakamura | |
| 9,535,346 | B2 | 1/2017 | Sekiya | |
| 9,535,347 | B2 | 1/2017 | Watariguchi | |
| 9,563,139 | B2 | 2/2017 | Kawahara | |
| 9,599,917 | B2 | 3/2017 | Okuda | |
| 9,645,515 | B2 | 5/2017 | Kuno | |
| 9,645,516 | B2 | 5/2017 | Kawahara | |
| 9,651,879 | B2 | 5/2017 | Maruyama | |
| 9,726,992 | B2 | 8/2017 | Sakuma | |
| 9,760,030 | B2 | 9/2017 | Sekiya | |
| 9,772,568 | B2 | 9/2017 | Sekido | |
| 9,811,011 | B2 | 11/2017 | Nishi | |
| 9,851,648 | B2 | 12/2017 | Nishi | |
| 9,864,285 | B2 | 1/2018 | Nishi | |
| 9,869,032 | B2 | 1/2018 | Kawahara | |
| 9,921,498 | B2 | 3/2018 | Sekido | |
| 10,162,278 | B2 | 12/2018 | Kuno | |
| 10,203,617 | B2 | 2/2019 | Kuno | |
| 10,303,085 | B2 | 5/2019 | Sato | |
| 10,372,050 | B2 | 8/2019 | Nishi | |
| 10,416,581 | B2 | 9/2019 | Ito | |
| 10,452,021 | B2 | 10/2019 | Miura | |
| 10,539,892 | B2 | 1/2020 | Nishida | |
| 10,545,453 | B2 | 1/2020 | Iwasaki | |
| 10,558,132 | B2 | 2/2020 | Ishiduka | |
| 10,558,133 | B2 | 2/2020 | Nakamura | |
| 10,571,833 | B2 * | 2/2020 | Uehara | G03G 15/1675 |
| 10,642,177 | B2 | 5/2020 | Nakamura | |
| 10,656,580 | B2 * | 5/2020 | Ogawara | G03G 15/0266 |
| 10,663,913 | B2 | 5/2020 | Yamaai | |
| 10,691,033 | B2 | 6/2020 | Nishida | |
| 10,747,130 | B2 | 8/2020 | Okuda | |
| 10,747,131 | B2 | 8/2020 | Watanabe | |
| 10,831,117 | B2 | 11/2020 | Sakakibara | |
| 10,831,118 | B2 | 11/2020 | Watanabe | |
| 10,838,315 | B2 | 11/2020 | Shimozawa | |
| 10,942,462 | B2 | 3/2021 | Ito | |
| 11,003,102 | B2 | 5/2021 | Ishiduka | |
| 11,112,719 | B2 | 9/2021 | Makisumi | |
| 11,126,097 | B2 | 9/2021 | Ishida | |
| 11,137,716 | B2 | 10/2021 | Hiyama | |
| 11,150,566 | B2 | 10/2021 | Iwasaki | |
| 11,181,837 | B2 | 11/2021 | Sekiya | |
| 11,237,493 | B2 | 2/2022 | Makisumi | |
| 11,249,407 | B2 | 2/2022 | Watariguchi | |
| 11,256,186 | B2 | 2/2022 | Shimozawa | |
| 11,340,553 | B2 | 5/2022 | Watariguchi | |
| 11,366,402 | B2 | 6/2022 | Ishiduka | |
| 11,392,050 | B2 | 7/2022 | Nishida | |
| 11,392,074 | B2 | 7/2022 | Ishida | |
| 2011/0217064 | A1 | 9/2011 | Sakata | |
| 2020/0103780 | A1 * | 4/2020 | Yoshiyama | G03G 15/1665 |
| 2021/0325793 | A1 | 10/2021 | Nakamura | |
| 2021/0325794 | A1 | 10/2021 | Iwasaki | |
| 2023/0055856 | A1 | 2/2023 | Sekiya | |
| 2023/0058278 | A1 | 2/2023 | Maruyama | |
| 2023/0059041 | A1 | 2/2023 | Kaku | |
| 2023/0059696 | A1 | 2/2023 | Watariguchi | |
| 2023/0059773 | A1 | 2/2023 | Yamaai | |
| 2023/0075407 | A1 | 3/2023 | Makisumi | |
| 2023/0101167 | A1 | 3/2023 | Shimozawa | |
| 2023/0115474 | A1 | 4/2023 | Watanabe | |
| 2023/0124743 | A1 | 4/2023 | Nakamura | |

OTHER PUBLICATIONS

U.S. Appl. No. 18/178,070, Kaname Watariguchi, filed Mar. 3, 2023.
U.S. Appl. No. 18/178,731, Chiharu Nakazono, filed Mar. 6, 2023.

* cited by examiner

ELECTROPHOTOGRAPHIC APPARATUS

BACKGROUND OF THE INVENTION

Field of the Invention

The present invention relates to an electrophotographic apparatus.

Description of the Related Art

In an electrophotographic apparatus using an electrophotographic photosensitive member, such as a copying machine, a laser beam printer, or a facsimile, first, the electrophotographic photosensitive member is uniformly charged, and an electrostatic latent image is formed on the electrophotographic photosensitive member with an image exposing unit such as a laser scanner. Then, the electrostatic latent image is developed with toner to form a toner image on the electrophotographic photosensitive member. Further, the toner image is transferred from the electrophotographic photosensitive member onto a transfer material such as paper, and the transferred toner image is fixed with heat, pressure, or the like. Thus, image formation is performed.

In the electrophotographic apparatus in recent years, the charging potential of the electrophotographic photosensitive member at the time of image formation has been required to be accurately controlled to a desired value in order to output an image having a constant density irrespective of the use environment of the electrophotographic apparatus and changes in conditions such as thicknesses of layers of the photosensitive member.

In addition, simultaneously with the foregoing, it is also required that a calibration time (referred to as "downtime") for performing the above-mentioned control and the like while image formation is not performed be shortened, and it is also strongly required that the control be performed at high speed.

As a related-art technology for controlling the charging potential of the electrophotographic photosensitive member at the time of image formation to a desired value, there has been proposed a technology involving directly detecting the charging potential of the electrophotographic photosensitive member with a potentiometer mounted in the electrophotographic apparatus (Japanese Patent Application Laid-Open No. H05-66638).

In addition, as a technology using no potentiometer, there has been proposed a technique involving estimating a voltage at which discharge starts to occur between a charging member and the electrophotographic photosensitive member (referred to as "discharge start voltage"), to thereby optimize the charging potential of the electrophotographic photosensitive member at the time of image formation with high accuracy (Japanese Patent No. 5615004). For example, when the electrophotographic photosensitive member is charged by a charging roller serving as the charging member, a high voltage is applied to the charging roller by a charging unit. Then, while a discharge current flowing in the charging roller is detected, the voltage to be applied is gradually changed, and the discharge start voltage is estimated from values of the discharge current detected in accordance with the applied voltage.

However, the charging potential measurement method described in Japanese Patent Application Laid-Open No. H05-66638 has had a problem in that, when a space for arranging the potentiometer is secured in the apparatus in order to accurately control the charging potential to a desired value, the electrophotographic apparatus is increased in size and becomes costly.

In addition, in the method described in Japanese Patent No. 5615004, the absolute value of the voltage needs to be gradually increased from a voltage at which discharge does not occur from the charging roller to the electrophotographic photosensitive member. Consequently, while its accuracy is high, the method has had a problem in that it takes time to complete the control. Accordingly, it has been difficult to perform the control of the charging potential within a short time period and with high accuracy, and an effect obtained by the method described in Japanese Patent No. 5615004 has not been sufficient in recent years when a further reduction in downtime has been required.

SUMMARY OF THE INVENTION

Accordingly, an object of the present invention is to provide an electrophotographic apparatus capable of controlling the charging potential of an electrophotographic photosensitive member at the time of image formation within a short time period and with high accuracy.

The above-mentioned object is achieved by the present invention to be described below.

That is, an electrophotographic apparatus according to the present invention is an electrophotographic apparatus including: an electrophotographic photosensitive member; a voltage application unit configured to cause discharge from an electroconductive member to the electrophotographic photosensitive member; a charge transfer amount detection unit configured to detect a charge transfer amount per unit time resulting from the discharge from the electroconductive member to the electrophotographic photosensitive member; and a charging potential control unit configured to control a charging potential of the electrophotographic photosensitive member, wherein when $V_1$ and $V_2$ are defined by the following procedures (1) to (8) for the electrophotographic photosensitive member, the $V_1$ and the $V_2$ satisfy a relationship represented by the following expression (E-4):

$$100V_1<V_2-V_1 \qquad \text{(E-4)},$$

and wherein the charging potential control unit is configured to control the charging potential of the electrophotographic photosensitive member at a time of image formation from a relationship between DC voltages at at least two points selected from a range in which an absolute value of a DC voltage applied by the voltage application unit is 700 V or more, and charge transfer amounts at the DC voltages at the at least two points:

(1) the electrophotographic photosensitive member is charged for 0.005 second;

(2) an absolute value of the charging potential obtained through measurement after 0.06 second from start of the charging in (1) is represented by $V_d$ [V];

(3) the electrophotographic photosensitive member is charged for 0.005 second so that the absolute value of the charging potential becomes the $V_d$ again after 0.18 second from the start of the charging in (1);

(4) exposure is performed with light having a wavelength of 805 nm and a light amount of 0.5 μJ/cm$^2$ after 0.02 second from start of the charging in (3);

(5) the absolute value of the charging potential obtained through measurement after 0.06 second from the start of the charging in (3) is defined as a residual potential $V_r$ [V];

(6) while the $V_d$ is changed from 100 V to 1,000 V at intervals of 50 V, the procedures (1) to (5) are repeatedly performed to measure the $V_r$ corresponding to each value of the $V_d$;

(7) a graph obtained by plotting the $V_d$ and the $V_r$ obtained in (6) with a horizontal axis representing the $V_d$ and a vertical axis representing the $V_r$ is approximated by the following equation (E-1) to determine constants A, "m", and τ in the following equation (E-1):

$$V_r = A + 1000\ \mathrm{m}\frac{1 - e^{\frac{V_d}{\tau}}}{1 - e^{\frac{1000}{\tau}}}; \tag{E-1}$$

and (8) voltages calculated by the following equations (E-2) and (E-3) through use of the constants A, "m", and τ determined in (7) are defined as the $V_1$ and the $V_2$, respectively:

$$V_1 = \frac{-\left(1 + 1000\ \mathrm{m}/\tau\left(1 - e^{1000/\tau}\right) + \sqrt{\left(1 + 1000\ \mathrm{m}/\tau\left(1 - e^{1000/\tau}\right)\right)^2 + 2000\ \mathrm{m}(V_{min} + A)/\tau^2\left(1 - e^{1000/\tau}\right)}\right.}{1000\ \mathrm{m}/\tau^2\left(1 - e^{1000/\tau}\right)} \tag{E-2}$$

in the equation (E-2), $V_{min}$ represents a numerical value determined by accuracy of the charge transfer amount detection unit.

$$V_2 = \begin{cases} -30 \times \dfrac{1 - \sqrt{1 - 2\left(1 + \frac{\tau}{30}\right)\left[1 + \frac{\tau\left(1 - e^{\frac{1000}{\tau}}\right)}{1000\ \mathrm{m}} + \frac{\tau\left(1 - e^{\frac{1000}{\tau}}\right)}{1000\ \mathrm{m}} \cdot \frac{A}{30}\right.}}{1 + 30/\tau} & (\tau > 0) \\ 30 \times \dfrac{1 + \sqrt{1 - 2\left(1 + \frac{\tau}{30}\right)\left[1 + \frac{\tau\left(1 - e^{\frac{1000}{\tau}}\right)}{1000\ \mathrm{m}} - \frac{\tau\left(1 - e^{\frac{1000}{\tau}}\right)}{1000\ \mathrm{m}} \cdot \frac{A}{30}\right.}}{1 - 30/\tau} & (\tau < 0) \end{cases} \tag{E-3}$$

Further features of the present invention will become apparent from the following description of exemplary embodiments with reference to the attached drawings.

DESCRIPTION OF THE EMBODIMENTS

Figure 1:
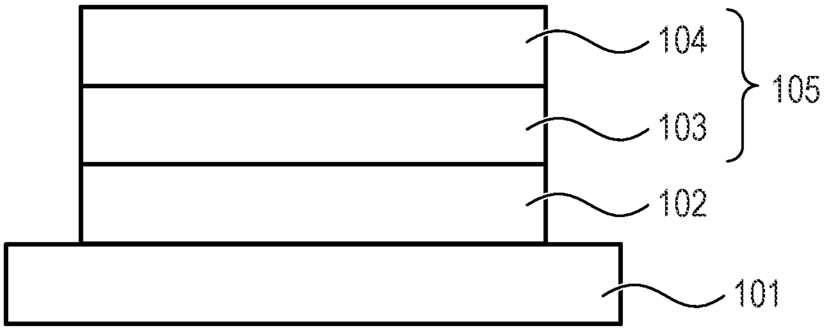
FIG. 1 is a view for illustrating an example of the layer configuration of an electrophotographic photosensitive member to be used in the present invention.

The present invention is described in detail below by way of exemplary embodiments.

[Electrophotographic Apparatus]

An electrophotographic apparatus according to the present invention is an electrophotographic apparatus including: an electrophotographic photosensitive member; a voltage application unit configured to cause discharge from an electroconductive member to the electrophotographic photosensitive member; a charge transfer amount detection unit configured to detect a charge transfer amount per unit time resulting from the discharge from the electroconductive member to the electrophotographic photosensitive member; and a charging potential control unit configured to control a charging potential of the electrophotographic photosensitive member, wherein when $V_1$ and $V_2$ are defined by the following procedures (1) to (8) for the electrophotographic photosensitive member, the $V_1$ and the $V_2$ satisfy a relationship represented by the following expression (E-4):

$$100V_1 < V_2 - V_1 \tag{E-4}$$

and wherein the charging potential control unit is configured to control the charging potential of the electrophotographic photosensitive member at a time of image formation from a relationship between DC voltages at at least two points selected from a range in which an absolute value of a DC voltage applied by the voltage application unit is 700 V or more, and charge transfer amounts at the DC voltages at the at least two points:

(1) the electrophotographic photosensitive member is charged for 0.005 second;

(2) an absolute value of the charging potential obtained through measurement after 0.06 second from start of the charging in (1) is represented by $V_d$ [V];

(3) the electrophotographic photosensitive member is charged for 0.005 second so that the absolute value of the charging potential becomes the $V_d$ again after 0.18 second from the start of the charging in (1);

(4) exposure is performed with light having a wavelength of 805 nm and a light amount of 0.5 μJ/cm$^2$ after 0.02 second from start of the charging in (3);

(5) the absolute value of the charging potential obtained through measurement after 0.06 second from the start of the charging in (3) is defined as a residual potential $V_r$ [V];

(6) while the $V_d$ is changed from 100 V to 1,000 V at intervals of 50 V, the procedures (1) to (5) are repeatedly performed to measure the $V_r$ corresponding to each value of the $V_d$;

(7) a graph obtained by plotting the $V_d$ and the $V_r$ obtained in (6) with a horizontal axis representing the $V_d$ and a vertical axis representing the $V_r$ is approximated by the following equation (E-1) to determine constants A, "m", and τ in the following equation (E-1):

$$V_r = A + 1000\,m\frac{1-e^{\frac{V_d}{\tau}}}{1-e^{\frac{1000}{\tau}}};\text{ and} \tag{E-1}$$

(8) voltages calculated by the following equations (E-2) and (E-3) through use of the constants A, "m", and τ determined in (7) are defined as the $V_1$ and the $V_2$, respectively:

$$V_1 = \frac{-\left(1 + 1000\text{ m}/\tau\left(1-e^{1000/\tau}\right) + \sqrt{\left(1 + 1000\text{ m}/\tau\left(1-e^{1000/\tau}\right)\right)^2 + 2000\text{ m}(V_{min}+A)/\tau^2\left(1-e^{1000/\tau}\right)}\right.}{1000\text{ m}/\tau^2\left(1-e^{1000/\tau}\right)} \tag{E-2}$$

in the equation (E-2), $V_{min}$ represents a numerical value determined by accuracy of the charge transfer amount detection unit.

$$V_2 = \begin{cases} -30\times\dfrac{1-\sqrt{1-2\left(1+\dfrac{\tau}{30}\right)\left[1+\dfrac{\tau\left(1-e^{\frac{1000}{\tau}}\right)}{1000\text{ m}}+\dfrac{\tau\left(1-e^{\frac{1000}{\tau}}\right)}{1000\text{ m}}\cdot\dfrac{A}{30}\right]}}{1+30/\tau} & (\tau>0) \\ 30\times\dfrac{1+\sqrt{1-2\left(1+\dfrac{\tau}{30}\right)\left[1+\dfrac{\tau\left(1-e^{\frac{1000}{\tau}}\right)}{1000\text{ m}}-\dfrac{\tau\left(1-e^{\frac{1000}{\tau}}\right)}{1000\text{ m}}\cdot\dfrac{A}{30}\right]}}{1-30/\tau} & (\tau<0) \end{cases} \tag{E-3}$$

In general, when an electrophotographic photosensitive member is charged and exposed in an actual image formation process, the charging potential of the electrophotographic photosensitive member does not necessarily become 0. A potential at an exposed portion in the case where an exposure amount is large is particularly called a residual potential.

In the present invention, the residual potential $V_r$ was defined by the following procedures:

(1) the electrophotographic photosensitive member is charged for 0.005 second;

(2) an absolute value of the charging potential obtained through measurement after 0.06 second from start of the charging in (1) is represented by $V_d$ [V];

(3) the electrophotographic photosensitive member is charged for 0.005 second so that the absolute value of the charging potential becomes the $V_d$ again after 0.18 second from the start of the charging in (1);

(4) exposure is performed with light having a wavelength of 805 nm and a light amount of 0.5 μJ/cm$^2$ after 0.02 second from start of the charging in (3); and (5) the absolute value of the charging potential obtained through measurement after 0.06 second from the start of the charging in (3) is defined as a residual potential $V_r$ [V].

The inventors have investigated a relationship between $V_d$ and the residual potential $V_r$ in accordance with the above-mentioned procedures (1) to (5) while changing $V_d$ from 100 V to 1,000 V at intervals of 50 V, and as a result, have found that the relationship therebetween can be approximated by the following equation (E-1).

$$V_r = A + 1000\,m\frac{1-e^{\frac{V_d}{\tau}}}{1-e^{\frac{1000}{\tau}}} \tag{E-1}$$

Figure 2:
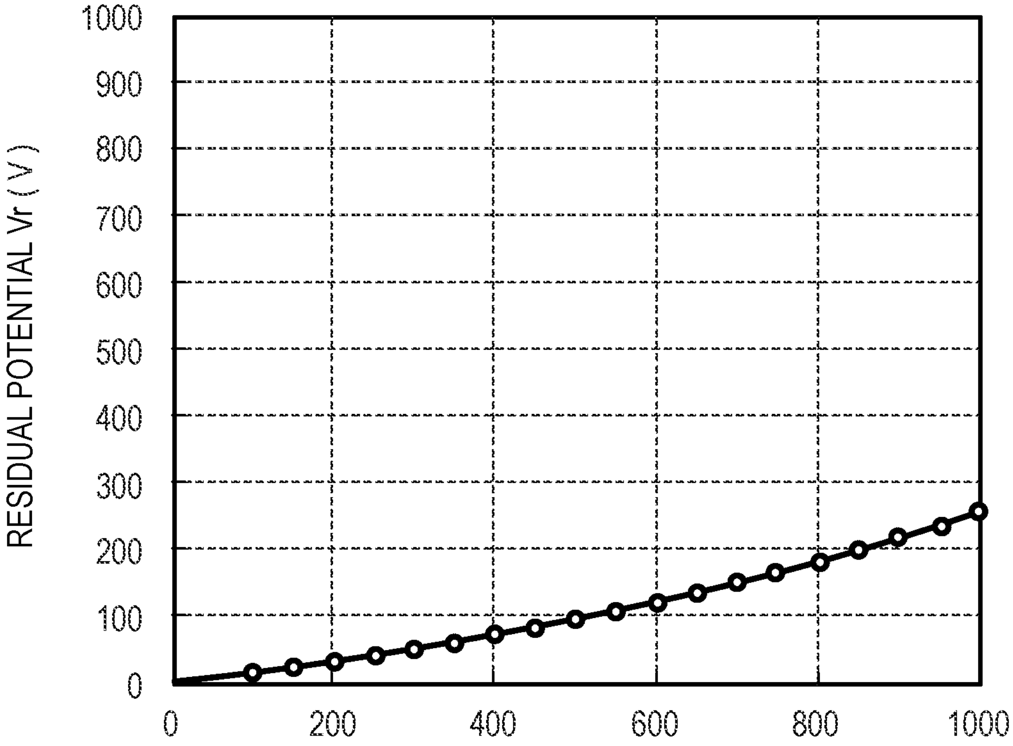
FIG. 2 is a graph showing a relationship between an absolute value $V_d$ of a charging potential and a residual potential $V_r$.

In the equation, the constant A corresponds to the residual potential $V_r$ in the case where $V_d$=0 is substituted into the equation (E-1), and means an intercept at which, when such a graph as shown in FIG. 2 is drawn with a horizontal axis representing $V_d$ and a vertical axis representing $V_r$, the approximate function expressed by the equation (E-1) intersects the vertical axis.

In addition, the constant "m" means the slope of a straight line connecting two points at $V_d$=0 and $V_d$=1,000 in the approximate function expressed by the equation (E-1).

Further, the constant τ represents the linearity of the approximate function expressed by the equation (E-1), and particularly in the limit $\tau\rightarrow\pm\infty$, the approximate function expressed by the equation (E-1) becomes a straight line.

In addition, the inventors have tried subjecting various electrophotographic photosensitive members to analysis involving using the above-mentioned approximate function, and as a result, have found that the values of the constants A, "m", and τ in the equation (E-1) vary depending on the configuration of the electrophotographic photosensitive member.

Further, the inventors have found that, when the charging potential of the electrophotographic photosensitive member at the time of image formation is controlled by the charging potential control unit to be described later, a condition for achieving both of high accuracy and a short time period can be calculated based on the values of those constants.

The above-mentioned condition is described in detail below.

In the present invention, the following configuration is used: the charge transfer amount per unit time resulting from discharge is detected instead of detecting the charging potential of the electrophotographic photosensitive member. A charge transfer amount I per unit time resulting from discharge to the electrophotographic photosensitive member is proportional to a difference between $V_d$ of the electrophotographic photosensitive member and the residual potential $V_r$, and may be expressed by the following equation (E-5).

$$I=k(V_d-V_r)=k\Delta V \tag{E-5}$$

In the equation (E-5), "k" represents a constant determined by the volume of the electrophotographic photosensitive member and the like.

Further, in the equation (E-5), ΔV may be expressed by the following equation (E-6) through use of the relationship of the equation (E-1).

$$\Delta V = V_d - A - 1000\ \mathrm{m}\frac{1 - e^{\frac{V_d}{\tau}}}{1 - e^{\frac{1000}{\tau}}} \tag{E-6}$$

As described later, the charge transfer amount detection unit has a minimum detectable potential difference specific to the electrophotographic apparatus. When the absolute value of the minimum detectable potential difference is represented by $V_{min}$, the absolute value of the charging potential in the case where the difference between $V_d$ of the electrophotographic photosensitive member and the residual potential $V_r$ is exactly equal to $V_{min}$ is the absolute value of the minimum detectable charging potential. When the absolute value of the minimum detectable charging potential is represented by $V_1$, the following equation (E-7) can be derived from the equation (E-6).

$$V_1 - A - 1000\ \mathrm{m}\frac{1 - e^{\frac{V_1}{\tau}}}{1 - e^{\frac{1000}{\tau}}} = V_{min} \tag{E-7}$$

$V_1$ is the lower limit value of the absolute value of the charging potential calculated based on the lower limit value of a detectable charge transfer amount in the main body of the electrophotographic apparatus. When the equation (E-7) is solved for $V_1$, the following equation (E-2) is obtained.

$$V_1 = \frac{-\left(1 + 1000\,m/\tau\left(1 - e^{2000/\tau}\right)\right) + \sqrt{\left(1 + 1000m/\tau\left(1 - e^{1000/\tau}\right)\right)^2 + 2000m(V_{min} + A)/\tau^2\left(1 - e^{1000/\tau}\right)}}{1000m/\tau^2\left(1 - e^{1000/\tau}\right)} \tag{E-2}$$

Figure 3:
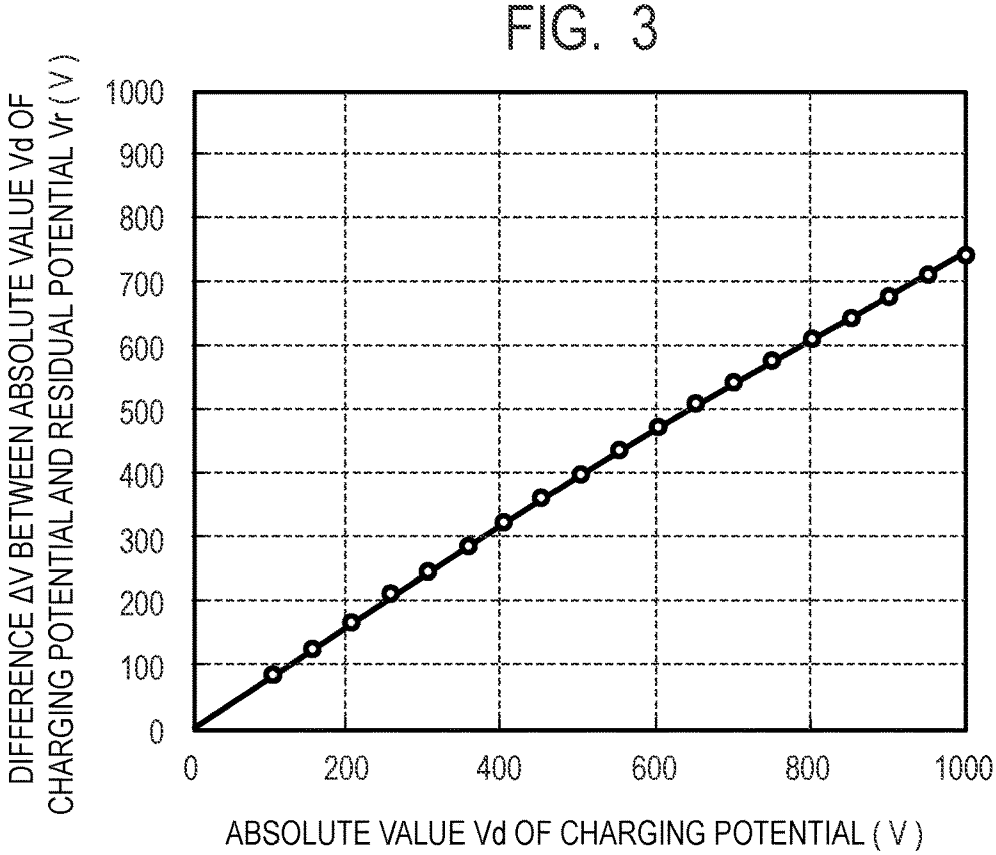
FIG. 3 is a graph showing a relationship between the absolute value $V_d$ of the charging potential and a difference ΔV between $V_d$ and the residual potential $V_r$.

In addition, the relationship represented by the equation (E-6) is expressed by such a graph as shown in FIG. 3 when drawn with a horizontal axis representing $V_d$ and a vertical axis representing ΔV. As apparent from the equation (E-6), the slope of such graph as shown in FIG. 3 is not necessarily constant, and as $V_d$ increases, the slope also changes. Consequently, when the discharge start voltage is estimated as in the related art described above in a high $V_d$ region, a deviation Δ occurs with respect to the actual discharge start voltage. A smaller absolute value of the deviation Δ means higher detection accuracy. In view of this, the absolute value of the charging potential at a time when the absolute value of the deviation Δ reaches a predetermined value is represented by $V_2$, and an upper limit condition under which charging potential control can be performed with high accuracy is defined by $V_2$. That is, $V_2$ is the upper limit condition of the absolute value of the charging potential for obtaining desired accuracy, calculated based on the characteristics of the electrophotographic photosensitive member.

$V_2$ is calculated as described below. First, when the equation (E-6) is differentiated with respect to $V_d$, the following equation (E-8) is obtained.

$$\frac{d\Delta V}{dV_d} = 1 + \frac{1000m}{\tau\left(1 - e^{\frac{1000}{\tau}}\right)}e^{\frac{V_d}{\tau}} \tag{E-8}$$

A value determined by the equation (E-8) means the slope of a tangent line at any point in the graph shown in FIG. 3, and hence the equation of the tangent line at $V_d$=$V_2$ is the following equation (E-9).

$$\Delta V = \left[1 + \frac{1000m}{\tau\left(1 - e^{\frac{1000}{\tau}}\right)}e^{\frac{V_2}{\tau}}\right](V_d - V_2) + \left[V_2 - A - 1000m\frac{1 - e^{\frac{V_2}{\tau}}}{1 - e^{\frac{1000}{\tau}}}\right] \tag{E-9}$$

Accordingly, the intercept of the tangent line expressed by the equation (E-9) with the horizontal axis is expressed by the following equation (E-10) assuming ΔV=0.

$$0 = \left[1 + \frac{1000m}{\tau\left(1 - e^{\frac{1000}{\tau}}\right)}e^{\frac{V_2}{\tau}}\right](V_d - V_2) + \left[V_2 - A - 1000m\frac{1 - e^{\frac{V_2}{\tau}}}{1 - e^{\frac{1000}{\tau}}}\right] \tag{E-10}$$

When the equation (E-10) is solved for $V_d$ and $V_d$=Δ is assumed, the following equation (E-11) is obtained.

$$\Delta = V_2 + \frac{A + \frac{1000m}{1 - e^{\frac{1000}{\tau}}}\left(1 - e^{\frac{V_2}{\tau}}\right) - V_2}{1 + \frac{1000m}{\left(1 - e^{\frac{1000}{\tau}}\right)\tau}e^{\frac{V_2}{\tau}}} \tag{E-11}$$

The absolute value of the deviation Δ for controlling the charging potential with high accuracy needs to be 30 V or less in a general electrophotographic apparatus. When τ is positive, the relationship between $V_d$ and $V_r$ becomes a convex downward function as shown in FIG. 2, and hence the relationship between $V_d$ and ΔV becomes a convex upward function as shown in FIG. 3. Accordingly, the intercept of the tangent line expressed by the equation (E-9) with the horizontal axis takes a negative value. That is, when τ is positive, $V_2$ is obtained by substituting Δ=−30 into the equation (E-11) and solving the equation (E-11) for $V_2$, and may be expressed by the following equation (E-3-a) ($V_2$>0).

$$V_2 = -30 \times \frac{1 - \sqrt{1 - 2\left(1 + \frac{\tau}{30}\right)\left[1 + \frac{\tau\left(1 - e^{\frac{1000}{\tau}}\right)}{1000m} + \frac{\tau\left(1 - e^{\frac{1000}{\tau}}\right)}{1000m}\cdot\frac{A}{30}\right]}}{1 + 30/\tau} \tag{E-3-a}$$

Meanwhile, when τ is negative, the relationship between $V_d$ and ΔV becomes a convex downward function. Accordingly, the intercept of the tangent line expressed by the equation (E-9) with the horizontal axis takes a positive value. That is, when τ is negative, $V_2$ is obtained by substituting Δ=30 into the equation (E-11) and solving the equation (E-11) for $V_2$, and may be expressed by the following equation (E-3-b) ($V_2$>0).

$$V_2 = 30 \times \frac{1 + \sqrt{1 - 2\left(1 - \frac{\tau}{30}\right)\left[1 + \frac{\tau\left(1 - e^{\frac{1000}{\tau}}\right)}{1000m} - \frac{\tau\left(1 - e^{\frac{1000}{\tau}}\right)}{1000m}\cdot\frac{A}{30}\right]}}{1 - 30/\tau} \tag{E-3-b}$$

In view of the foregoing, $V_2$ is divided into cases depending on the sign of τ to give the following equation (E-3).

$$V_2=\begin{cases}-30\times\dfrac{1-\sqrt{1-2\left(1+\dfrac{\tau}{30}\right)\left[1+\dfrac{\tau\left(1-e^{\frac{1000}{\tau}}\right)}{1000m}+\dfrac{\tau\left(1-e^{\frac{1000}{\tau}}\right)}{1000m}\cdot\dfrac{A}{30}\right]}}{1+30/\tau} & (\tau>0)\\ 30\times\dfrac{1+\sqrt{1-2\left(1-\dfrac{\tau}{30}\right)\left[1+\dfrac{\tau\left(1-e^{\frac{1000}{\tau}}\right)}{1000m}-\dfrac{\tau\left(1-e^{\frac{1000}{\tau}}\right)}{1000m}\cdot\dfrac{A}{30}\right]}}{1-30/\tau} & (\tau<0)\end{cases}\quad\text{(E-3)}$$

Next, a relationship between the above-mentioned $V_1$ and $V_2$ is described. The range of $V_d$ defined by $V_1$ and $V_2$ needs to be set sufficiently wider than the detection lower limit of the charge transfer amount detection unit in the present invention, i.e., $V_1$. As a result of an investigation made by the inventors, it has been found that the following conditional expression (E-4) needs to be satisfied. That is, when the charging potential of the electrophotographic photosensitive member at the time of image formation is controlled, the condition for achieving both of high accuracy and a short time period is that the following expression (E-4) is satisfied.

$$100V_1<V_2-V_1 \quad\text{(E-4)}$$

As described above, the phenomenon that the residual potential of the electrophotographic photosensitive member changes with an increase in charging potential is the one that causes the deviation Δ with respect to the actual discharge start voltage when the discharge start voltage is estimated by detecting the charge transfer amount per unit time resulting from discharge. Accordingly, as another technique for keeping the deviation Δ at a low level, the charging potential can be controlled with high accuracy by performing control involving providing a sufficiently long exposure time to allow the residual potential to approach 0. However, when this technique is used, a long control time is required to allow the residual potential to become 0, leading to an increase in downtime, and hence increased accuracy and a shortened time period cannot both be achieved.

In the present invention, in order to control the charging potential with higher accuracy, the deviation Δ is preferably within 10 V. In this case, in the same manner as in the above-mentioned case, when Δ=−10 or Δ=10 is substituted into the equation (E-11), $V_2'$ expressed by the following equation (E-12) is obtained.

$$V_2'=\begin{cases}-10\times\dfrac{1-\sqrt{1-2\left(1+\dfrac{\tau}{10}\right)\left[1+\dfrac{\tau\left(1-e^{\frac{1000}{\tau}}\right)}{1000m}+\dfrac{\tau\left(1-e^{\frac{1000}{\tau}}\right)}{1000m}\cdot\dfrac{A}{10}\right]}}{1+10/\tau} & (\tau>0)\\ 10\times\dfrac{1+\sqrt{1-2\left(1-\dfrac{\tau}{10}\right)\left[1+\dfrac{\tau\left(1-e^{\frac{1000}{\tau}}\right)}{1000m}-\dfrac{\tau\left(1-e^{\frac{1000}{\tau}}\right)}{1000m}\cdot\dfrac{A}{10}\right]}}{1-10/\tau} & (\tau<0)\end{cases}\quad\text{(E-12)}$$

Accordingly, the above-mentioned $V_2'$ and $V_1$ expressed by the equation (E-2) preferably satisfy a relationship expressed by the following expression (E-13) in order to control the charging potential of the electrophotographic photosensitive member at the time of image formation with higher accuracy.

$$100V_1<V_2'-V_1 \quad\text{(E-13)}$$

In the present invention, as a characteristic of the electrophotographic photosensitive member, the absolute value of the residual potential is preferably low irrespective of the charging potential because the lower limit condition expressed by the equation (E-2) can be made smaller and the upper limit condition expressed by the equation (E-3) can be made larger. In particular, the absolute value of the constant A is preferably small, and specifically, the constant A is preferably 15 or less.

In addition, in the present invention, as a characteristic of the electrophotographic photosensitive member, the slope of the change of the residual potential with respect to the charging potential is preferably small. That is, the constant "m" is preferably small because the lower limit condition expressed by the equation (E-2) can be made smaller and the upper limit condition expressed by the equation (E-3) can be made larger. Specifically, the constant "m" is preferably 0.05 or less.

Further, in the present invention, the absolute value of the constant τ, which represents a characteristic of the electrophotographic photosensitive member, is preferably large because the lower limit condition expressed by the equation (E-2) can be made smaller and the upper limit condition expressed by the equation (E-3) can be made larger. Specifically, the absolute value of the constant τ is preferably 4,000 or more.

The voltage application unit in the present invention may be a charging unit configured to charge the electrophotographic photosensitive member, may be a transfer unit configured to transfer toner from the surface of the electrophotographic photosensitive member onto a transfer material, or may be arranged separately from the charging unit and the transfer unit. In addition, the electroconductive member in the present invention may be a charging member configured to charge the electrophotographic photosensitive member, may be a transfer member, or may be arranged separately from these members.

In particular, it is preferred that the voltage application unit be a charging unit configured to charge the electrophotographic photosensitive member, and that the electroconductive member be a charging member. In addition, it is preferred that the voltage application unit be a transfer unit configured to transfer toner from the surface of the electrophotographic photosensitive member onto a transfer material, and that the electroconductive member be a transfer member.

In addition, when the voltage application unit is a charging unit configured to charge the electrophotographic photosensitive member, and the electroconductive member is a charging member, the charging member is preferably a charging roller.

In addition, when the voltage application unit is a transfer unit configured to transfer toner from the surface of the electrophotographic photosensitive member onto a transfer material, and the electroconductive member is a transfer member, the transfer member is preferably a transfer roller.

The electrophotographic apparatus according to the present invention may include, for example, an image exposing unit, a developing unit, a fixing unit, and a cleaning unit in addition to the foregoing. The image exposing unit is a unit configured to irradiate the surface of the electrophotographic photosensitive member with image exposure light to form an electrostatic latent image on the surface of the electrophotographic photosensitive member. In addition, the developing unit is a unit configured to develop the electrostatic latent image with toner to form a toner image on the surface of the electrophotographic photosensitive member. In addition, the fixing unit is a unit configured to subject the transfer material onto which the toner image has been transferred by the transfer unit to treatment for fixing the toner image. In addition, the cleaning unit is a unit configured to remove a deposit such as the toner remaining on the surface of the electrophotographic photosensitive member after the transfer.

Figure 4:
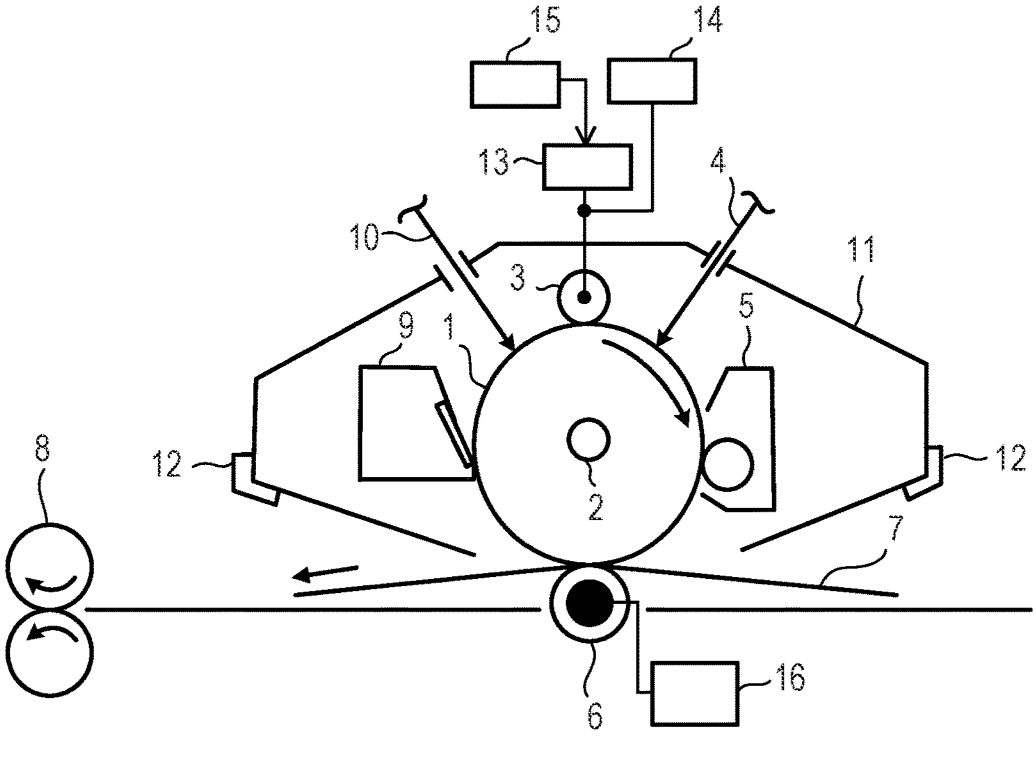
FIG. 4 is a view for illustrating an example of the schematic configuration of an electrophotographic apparatus according to the present invention in the case where the electrophotographic apparatus includes a process cartridge including the electrophotographic photosensitive member and its voltage application unit is a charging unit.

In FIG. 4, there is illustrated an example of the schematic configuration of the electrophotographic apparatus according to the present invention in the case where the voltage application unit is a charging unit and the electroconductive member is a charging member.

An electrophotographic photosensitive member 1 of a cylindrical shape is rotationally driven about a shaft 2 in a direction indicated by the arrow at a predetermined peripheral speed. The surface of the electrophotographic photosensitive member 1 is charged to a predetermined positive or negative potential by a charging unit 13 through discharge via a charging member 3. The charged surface of the electrophotographic photosensitive member 1 is irradiated with exposure light 4 from an exposing unit (not shown), and thus an electrostatic latent image corresponding to target image information is formed thereon. The electrostatic latent image formed on the surface of the electrophotographic photosensitive member 1 is developed with toner stored in a developing unit 5 to form a toner image on the surface of the electrophotographic photosensitive member 1. The toner image formed on the surface of the electrophotographic photosensitive member 1 is transferred by a transfer member 6, which is mounted onto a transfer unit 16, onto a transfer material 7. The transfer material 7 onto which the toner image has been transferred is conveyed to a fixing unit 8, and is subjected to treatment for fixing the toner image to be printed out to the outside of the electrophotographic apparatus.

The electrophotographic apparatus may include a cleaning unit 9 configured to remove a deposit such as the toner remaining on the surface of the electrophotographic photosensitive member 1 after the transfer. In addition, a so-called cleaner-less system configured to remove the deposit with the developing unit 5 or the like without separate arrangement of the cleaning unit 9 may be used.

The electrophotographic apparatus may include an electricity-removing mechanism configured to subject the surface of the electrophotographic photosensitive member 1 to electricity-removing treatment with pre-exposure light 10 from a pre-exposing unit (not shown). In addition, a guiding unit 12 such as a rail may be arranged for removably mounting a process cartridge 11 onto the main body of the electrophotographic apparatus.

The electrophotographic apparatus in the case where the charging unit 13 is the voltage application unit and the electroconductive member is the charging member 3 further includes a charge transfer amount detection unit 14.

The charge transfer amount detection unit 14 is configured to detect a charge transfer amount per unit time resulting from discharge from the charging member 3 to the electrophotographic photosensitive member 1. The detection portion of the charge transfer amount detection unit 14 includes: a detection circuit configured to convert a charge transfer amount flowing between the charging member 3 and the electrophotographic photosensitive member 1 at the time of DC voltage application into a voltage; and an amplifier configured to amplify the converted voltage signal, and to output the resultant as a discharge detection signal to a CPU. The CPU subjects the discharge detection signal from the amplifier to A/D conversion with an A/D convertor. Based on the A/D-converted output from the amplifier, the CPU recognizes the magnitude of a generated current (magnitude of a current that has flowed between the charging member and the electrophotographic photosensitive member), and can output a current value averaged over the time T (ms) per rotation of the electrophotographic photosensitive member 1.

In FIG. 2, a configuration in which a charge transfer amount flowing toward the charging member at the time of voltage application is detected is adopted. However, a configuration in which a charge transfer amount flowing toward the electrophotographic photosensitive member 1 at the time of voltage application is detected may be adopted.

In addition, the charge transfer amount detection unit 14 has a minimum detectable potential difference specific to the electrophotographic apparatus. The minimum detectable potential difference may be calculated in the following manner. The charge transfer amount detection unit 14 cannot detect the charge transfer amount resulting from the discharge from the charging member 3 to the electrophotographic photosensitive member 1 when the charge transfer amount per unit time is low owing to electrical noise due to an AC component, the temperature change of circuit resistance, or the rotation unevenness of the electrophotographic photosensitive member 1 or the charging member 3. Accordingly, a minimum detectable charge transfer amount $I_{min}$ per unit time exists. A method of measuring $I_{min}$ is not particularly limited, but for example, $I_{min}$ may be measured in the following manner. First, a DC voltage during image formation (e.g., −1,100 V) is applied to the electrophotographic photosensitive member 1. Then, under each of a high-temperature and high-humidity environment having a temperature of 32.5° C. and a humidity of 80% and a low-temperature and low-humidity environment having a temperature of 15° C. and a humidity of 10%, the above-mentioned charge transfer amount per unit time when a drum motor is driven is sampled through 10 rotations of the electrophotographic photosensitive member 1. Subsequently, a difference between the maximum value and minimum value of the charge transfer amount per unit time may be adopted as the minimum detectable charge transfer amount $I_{min}$ per unit time.

Further, $I_{min}$ may be converted into the minimum detectable potential difference. A method therefor is not particularly limited, but for example, such a method as described below is available. First, (1) Q=CV is solved based on a rotational speed "v" of the electrophotographic photosensitive member 1, a thickness "d" of the charge transporting layer of the electrophotographic photosensitive member 1, and a dielectric constant E of the electrophotographic photosensitive member 1. In the equation, Q represents a charge amount, C represents a capacitance, and V represents a charging potential. Subsequently, (2) charging voltages $V_a$ and $V_b$ which certainly exceed the discharge start voltage in consideration of the temperature, the humidity, and atmospheric pressure are applied, and charge transfer amounts $I_a$ and $I_b$ per unit time at the time of the application are measured, followed by the calculation of $V_{min}$ by the following equation (E-14).

$$V_{min}=|I_{min}\times(V_a-V_b)/(I_a-I_b)| \quad \text{(E-14)}$$

In the present invention, the electrophotographic apparatus includes a charging potential control unit 15. The charging potential control unit 15 is configured to control the charging potential of the electrophotographic photosensitive member 1 at the time of image formation from a relationship between DC voltages at at least two points selected from a range in which the absolute value of a DC voltage applied by the voltage application unit is 700 V or more, and charge transfer amounts at the DC voltages at the at least two points.

In the charging potential control unit 15 to be used in the present invention, a method of determining a control variable for controlling the charging potential is not particularly limited, but examples thereof include such methods as described in the following (1) and (2).

(1) A method involving estimating a discharge start voltage $V_{th}$ from the relationship between the DC voltages and the charge transfer amounts per unit time at at least two points, and determining a DC voltage $V_{DC}$ to be applied at the time of image formation based on the following equation (E-15) with respect to a control target value $V_{td}$ of the charging potential.

$$V_{DC}=V_{th}+V_{td} \quad \text{(E-15)}$$

(2) A method involving calculating a slope S expressed by the following equation (E-16) from the relationship between the DC voltages and the charge transfer amounts per unit time at at least two points, and determining a target value $I_t$ of the charge transfer amount per unit time based on the following equation (E-17).

$$S=(I_p-I_q)(V_p-V_q) \quad \text{(E-16)}$$

$$I_t=S\times V_{td} \quad \text{(E-17)}$$

It is preferred that the charging potential control unit 15 be configured to control a DC voltage to be applied at the time of image formation from the relationship between DC voltages at at least two points selected from the range in which the absolute value is 700 V or more, which are applied by the voltage application unit, and the charge transfer amounts at the DC voltages at the at least two points.

It is also preferred that the charging potential control unit 15 be configured to: approximate a relationship between DC voltages at "n" points selected from the range in which the absolute value is 700 V or more, which are applied by the voltage application unit, and charge transfer amounts at the DC voltages at the "n" points, by a function having a degree of freedom of "n" or less; and control the charging potential of the electrophotographic photosensitive member at the time of image formation by using the function as a calibration curve. Here, "n" represents an integer of 2 or more. In this case, in particular, the function is more preferably a linear function.

In addition, the electrophotographic apparatus according to the present invention preferably satisfies the following condition in order to control the charging potential of the electrophotographic photosensitive member at the time of image formation with higher accuracy. First, of the DC voltages at at least two points selected from the range in which the absolute value is 700 V or more, which are applied by the voltage application unit, the DC voltage having the smallest absolute value is represented by $V_{DC-min}$, and the DC voltage having the largest absolute value is represented by $V_{DC-MAX}$. In addition, the absolute value of the charging potential of the electrophotographic photosensitive member at the $V_{DC-min}$ is represented by $V_{dm}$, and the absolute value of the charging potential of the electrophotographic photosensitive member at the $V_{DC-MAX}$ is represented by $V_{dM}$. At this time, the $V_{dm}$ and the $V_{dM}$ are larger than the $V_1$ and equal to or smaller than the $V_2$. That is, the $V_{dm}$ and the $V_{dM}$, and the $V_1$ and the $V_2$ preferably satisfy a relationship represented by the following expression (E-18).

$$V_1<V_{dm}<V_{dM}\leq V_2 \quad \text{(E-18)}$$

In addition, the $V_{dm}$ and the $V_{dM}$, and the $V_1$ and the $V_2'$ more preferably satisfy a relationship represented by the following expression (E-19).

$$V_1<V_{dm}<V_{dM}\leq V_2' \quad \text{(E-19)}$$

[Electrophotographic Photosensitive Member]

As a method of producing the electrophotographic photosensitive member to be used in the present invention, there is given a method involving preparing coating liquids for respective layers to be described later, applying the coating liquids onto a support in a desired order of layers, and drying the coating liquids. In this case, as a method of applying the coating liquids, there are given, for example, dip coating, spray coating, inkjet coating, roll coating, die coating, blade coating, curtain coating, wire bar coating, and ring coating. Of those, dip coating is preferred from the viewpoints of efficiency and productivity.

The support and the respective layers are described below.

<Support>

In the present invention, the electrophotographic photosensitive member includes an electroconductive support. In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, an aluminum support using aluminum is preferred.

In addition, electroconductivity may be imparted to the resin or the glass through treatment involving, for example, mixing or coating the resin or the glass with an electroconductive material.

<Electroconductive Layer>

In the present invention, an electroconductive layer may be arranged on the support. The arrangement of the electroconductive layer can conceal flaws and unevenness in the surface of the support, and control the reflection of light on the surface of the support.

The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, each of the electroconductive particles may be of a laminated configuration having a core particle and a coating layer coating the particle. Examples of the core particle include titanium oxide, barium sulfate, and zinc oxide. The coating layer is, for example, a metal oxide such as tin oxide.

In addition, when the metal oxide is used as the electroconductive particles, their volume-average particle diameter is preferably 1 to 500 nm, more preferably 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, resin particles, or titanium oxide.

The electroconductive layer has a thickness of preferably 1 to 50 μm, particularly preferably 3 to 40 μm.

The electroconductive layer may be formed by preparing a coating liquid for an electroconductive layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particles in the coating liquid for an electroconductive layer is, for example, a method involving using a paint shaker, a sand mill, a ball mill, or a liquid collision-type high-speed disperser.

<Undercoat Layer>

In the present invention, an undercoat layer may be arranged on the electroconductive support or the electroconductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

Of those, a polyamide resin is preferred, and a polyamide resin soluble in an alcohol-based solvent is preferred. For example, ternary (6-66-610) copolymerized polyamide, quaternary (6-66-610-12) copolymerized polyamide, N-methoxymethylated nylon, polymerized fatty acid-based polyamide, a polymerized fatty acid-based polyamide block copolymer, and copolymerized polyamide having a diamine component are preferably used.

In addition, the undercoat layer may further contain an electron transporting substance, a metal oxide, a metal, an electroconductive polymer, and the like for the purpose of improving electric characteristics. Of those, an electron-transporting substance and a metal oxide are preferably used because an effect of pulling out charge in a charge generating layer is obtained even in a low electric field.

Examples of the electron transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron transporting substance having a polymerizable functional group may be used as the electron transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The undercoat layer has a thickness of preferably 0.1 to 10 μm, more preferably 0.2 to 5 μm, particularly preferably 0.5 to 3 μm.

The undercoat layer may be formed by preparing a coating liquid for an undercoat layer containing the above-mentioned materials and a solvent, forming a coat thereof, and drying and/or curing the coat. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

The photosensitive layer of the electrophotographic photosensitive member is mainly classified into (1) a laminate-type photosensitive layer and (2) a monolayer-type photosensitive layer. (1) The laminate-type photosensitive layer is a photosensitive layer having a charge generating layer containing a charge generating substance and a charge transporting layer containing a charge transporting substance. (2) The monolayer-type photosensitive layer is a photosensitive layer containing both a charge generating substance and a charge transporting substance.

(1) Laminate-Type Photosensitive Layer

The laminate-type photosensitive layer has the charge generating layer and the charge transporting layer.

(1-1) Charge Generating Layer

The charge generating layer preferably contains the charge generating substance and a resin.

Examples of the charge generating substance include azo pigments, perylene pigments, polycyclic quinone pigments, indigo pigments, and phthalocyanine pigments. Of those, phthalocyanine pigments are preferred. Of the phthalocyanine pigments, a hydroxygallium phthalocyanine pigment or a titanyl phthalocyanine pigment is preferred.

In the case where the phthalocyanine pigment is used as the as the charge generating substance, when a dispersant is used in milling treatment in the preparation of the phthalocyanine pigment, the amount of the dispersant is preferably 10 to 50 times as large as that of the phthalocyanine pigment on a mass basis. In addition, examples of a solvent to be used include: amide-based solvents, such as N,N-dimethylformamide, N,N-dimethylacetamide, N-methylformamide, N-methylacetamide, and N-methylpropionamide; halogen-based solvents such as chloroform; ether-based solvents such as tetrahydrofuran; and sulfoxide-based solvents such as dimethyl sulfoxide. In addition, the usage amount of the solvent is preferably 5 to 30 times as large as that of the phthalocyanine pigment on a mass basis.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge generating layer may further contain an additive, such as an antioxidant or a UV absorber. Specific examples thereof include a hindered phenol compound, a hindered amine compound, a sulfur compound, a phosphorus compound, and a benzophenone compound.

The average thickness of the charge generating layer of the present invention is preferably 0.12 μm or more from the standpoint of stabilizing the residual potential at a low level irrespective of the magnitude of the charging potential, and is more preferably 0.14 μm or more.

The charge generating layer may be formed by preparing a coating liquid for a charge generating layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge Transporting Layer

The charge transporting layer preferably contains the charge transporting substance and a resin.

Examples of the charge transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a compound having an ionization potential of 5.2 to 5.4 eV is preferred for obtaining the effect of the present application. When the ionization potential is less than 5.2 eV, α, which represents electric field intensity dependence, is large, and a memory phenomenon is exacerbated after endurance in some cases. When the ionization potential is more than 5.4 eV, the residual potential is increased in some cases.

With regard to the measurement of the ionization potential, the ionization potential was measured by measuring threshold energy for the release of an electron through use of an atmospheric photoelectron spectrometer manufactured by Riken Keiki Co., Ltd. (product name: AC-2).

The content of the charge transporting substance in the charge transporting layer is preferably 25 to 70 mass %, more preferably 30 to 55 mass % with respect to the total mass of the charge transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge transporting substance and the resin is preferably 4:10 to 20:10, more preferably 5:10 to 12:10.

In addition, the charge transporting layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The charge transporting layer has an average thickness of preferably 5 to 30 μm, more preferably 8 to 17 μm, particularly preferably 10 to 14 μm.

The charge transporting layer may be formed by preparing a coating liquid for a charge transporting layer containing the above-mentioned materials and a solvent, forming a coat thereof, and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

(2) Monolayer-Type Photosensitive Layer

The monolayer-type photosensitive layer may be formed by preparing a coating liquid for a photosensitive layer containing the charge generating substance, the charge transporting substance, a resin, and a solvent, forming a coat thereof on the undercoat layer, and drying the coat. Examples of the charge generating substance, the charge transporting substance, and the resin are the same as those of the materials in the section "(1) Laminate-type Photosensitive Layer."

<Protection Layer>

In the present invention, a protection layer may be arranged on the photosensitive layer. The arrangement of the protection layer can improve durability.

It is preferred that the protection layer contain electroconductive particles and/or a charge transporting substance and a resin.

Examples of the electroconductive particles include particles of metal oxides, such as titanium oxide, zinc oxide, tin oxide, and indium oxide.

Examples of the charge transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protection layer may be formed as a cured film by polymerizing a composition containing a monomer having a polymerizable functional group. As a reaction in this case, there are given, for example, a thermal polymerization reaction, a photopolymerization reaction, and a radiation polymerization reaction. Examples of the polymerizable functional group of the monomer having a polymerizable functional group include an acryloyl group and a methacryloyl group. A material having a charge transporting ability may be used as the monomer having a polymerizable functional group.

The protection layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The average thickness of the protection layer is preferably 0.5 to 5 μm, more preferably 1 to 3 μm.

The protection layer may be formed by preparing a coating liquid for a protection layer containing the above-mentioned materials and a solvent, forming a coat thereof, and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

It is preferred that the electrophotographic photosensitive member to be used in the present invention include a support, an undercoat layer, a charge generating layer, and a charge transporting layer in the stated order, and that the undercoat layer contain a polyamide resin and metal oxide particles. In addition, it is preferred that the metal oxide particles be titanium oxide particles, and that the shape of each of the titanium oxide particles be a spherical shape, and the average primary particle diameter thereof is preferably 10 to 100 nm from the viewpoints of the suppression of charge accumulation and uniform dispersibility. In addition, the thickness of the undercoat layer is preferably 0.5 to 3.0 μm.

From the viewpoint of suppressing an increase in residual potential, the crystal structure of titanium oxide for forming the above-mentioned titanium oxide particles is preferably a rutile type or an anatase type, and is more preferably a rutile type having weak photocatalytic activity. In the case of a rutile type, the rutilation ratio of the particles is preferably 90% or more. The titanium oxide particles may be treated with a silane coupling agent or the like from the viewpoint of dispersibility. For example, a case in which the titanium oxide particles are surface-treated with vinylsilane is preferred because an effect of pulling out the charge in the charge generating layer is obtained even in a low electric field, and hence the residual potential is stabilized at a lower level.

Further, it is preferred that the charge generating layer contain a titanyl phthalocyanine pigment, and that the titanyl phthalocyanine pigment be a titanyl phthalocyanine pigment satisfying the following conditions. That is, the titanyl phthalocyanine pigment includes crystal particles each of which has a crystal form showing peaks at Bragg angles 2θ of 9.8°±0.3° and 27.1°±0.3° in an X-ray diffraction spectrum using a CuKα ray. Further, the titanyl phthalocyanine pigment has a peak A in the range of from 50 to 150 nm in a crystal particle size distribution measured using small-angle X-ray scattering, and the peak A has a half width of 100 nm or less.

In addition, it is preferred that the charge generating layer contain a hydroxygallium phthalocyanine pigment, and that the hydroxygallium phthalocyanine pigment be a hydroxygallium phthalocyanine pigment satisfying the following conditions. That is, the hydroxygallium phthalocyanine pigment includes crystal particles each of which has a crystal form showing peaks at Bragg angles 2θ of 7.4°±0.3° and 28.2°+0.3° in an X-ray diffraction spectrum using a CuKα ray. Further, the hydroxygallium phthalocyanine pigment has a peak B in the range of from 20 to 50 nm in a crystal particle size distribution measured using small-angle X-ray scattering, and the peak B has a half width of 50 nm or less.

The powder X-ray diffraction measurement of the phthalocyanine pigment may be performed under the following conditions.

(Powder X-Ray Diffraction Measurement)

Measurement apparatus used: X-ray diffraction apparatus RINT-TTRII manufactured by Rigaku Corporation
X-ray tube bulb: Cu
X-ray wavelength: Kα1
Tube voltage: 50 KV
Tube current: 300 mA
Scan method: 2θ scan
Scan speed: 4.0°/min
Sampling interval: 0.02°
Start angle 2θ: 5.0°
Stop angle 2θ: 35.0°
Goniometer: rotor horizontal goniometer (TTR-2)
Attachment: capillary rotating sample stage
Filter: not used
Detector: scintillation counter
Incident monochrometer: used
Slit: variable slit (parallel beam method)
Counter monochrometer: not used
Divergence slit: open
Divergence vertical limit slit: 10.00 mm
Scattering slit: open
Light receiving slit: open According to the present invention, the electrophotographic apparatus capable of controlling the charging potential of an electrophotographic photosensitive member at the time of image formation within a short time period and with high accuracy can be provided.

EXAMPLES

The present invention is described in more detail below by way of Examples and Comparative Examples. The present invention is by no means limited to the following Examples, and various modifications may be made without departing from the gist of the present invention. In the description in the following Examples, the term "part(s)" is by mass unless otherwise specified.

The thicknesses of the respective layers of electrophotographic photosensitive members according to Examples and Comparative Examples except a charge generating layer were each determined by a method involving using an eddy current-type thickness meter (Fischerscope, manufactured by Fischer Instruments K.K.) or a method involving converting the mass of the layer per unit area into the thickness thereof through use of the specific gravity thereof. The thickness of the charge generating layer was measured by converting the Macbeth density value of the electrophotographic photosensitive member with the Macbeth density value and a calibration curve obtained in advance from the value of the thickness of the layer measured by the observation of a sectional SEM image thereof. Herein, the Macbeth density value was measured by pressing a spectral densitometer (product name: X-Rite 504/508, manufactured by X-Rite) against the surface of the electrophotographic photosensitive member.

[Preparation Example of Coating Liquid 1 for Undercoat Layer]

100 Parts of rutile-type titanium oxide particles (average primary particle diameter: 50 nm, manufactured by Tayca Corporation) were stirred and mixed with 500 parts of toluene, and 3.0 parts of methyldimethoxysilane ("TSL8117" manufactured by Toshiba Silicone Co., Ltd.) was added to the mixture, followed by stirring for 8 hours. After that, toluene was evaporated by distillation under reduced pressure, and the residue was dried at 120° C. for 3 hours. Thus, rutile-type titanium oxide particles whose surfaces had already been treated with methyldimethoxysilane were obtained.

Subsequently, the following materials were prepared.

| | |
|---|---|
| The rutile-type titanium oxide particles whose surfaces have already been treated with methyldimethoxysilane | 18 parts |
| N-methoxymethylated nylon (product name: TORESIN EF-30T, manufactured by Nagase ChemteX Corporation) | 4.5 parts |
| Copolymerized nylon resin (product name: AMILAN CM8000, manufactured by Toray Industries, Inc.) | 1.5 parts |

Those materials were added to a mixed solvent of 90 parts of methanol and 60 parts of 1-butanol to prepare a dispersion liquid. The dispersion liquid was subjected to dispersion treatment with a vertical sand mill using glass beads each having a diameter of 1.0 mm for 6 hours. The dispersion liquid subjected to the sand mill dispersion treatment was then further subjected to dispersion treatment with an ultrasonic disperser (UT-205, manufactured by Sharp Corporation) for 1 hour to prepare a coating liquid 1 for an undercoat layer. The output of the ultrasonic disperser was set to 100%. In addition, media such as glass beads were not used in this dispersion treatment.

[Preparation Example of Coating Liquid 2 for Undercoat Layer]

A coating liquid 2 for an undercoat layer was prepared in the same manner as the coating liquid 1 for an undercoat layer except that in the preparation example of the coating liquid 1 for an undercoat layer, the sand mill dispersion treatment time was changed to 4 hours.

[Preparation Example of Coating Liquid 3 for Undercoat Layer]

100 Parts of rutile-type titanium oxide particles (average primary particle diameter: 15 nm, manufactured by Tayca Corporation) were stirred and mixed with 500 parts of toluene, and 9.6 parts of methyldimethoxysilane ("TSL8117" manufactured by Toshiba Silicone Co., Ltd.) was further added to the mixture, followed by stirring for 8 hours. After that, toluene was evaporated by distillation under reduced pressure, and the residue was dried at 120° C. for 3 hours. Thus, rutile-type titanium oxide particles whose surfaces had already been treated with methyldimethoxysilane were obtained.

Subsequently, the following materials were prepared.

| | |
|---|---|
| The rutile-type titanium oxide particles whose surfaces have already been treated with methyldimethoxysilane | 6 parts |
| N-methoxymethylated nylon (product name: TORESIN EF-30T, manufactured by Nagase ChemteX Corporation) | 4.5 parts |
| Copolymerized nylon resin (product name: AMILAN CM8000, manufactured by Toray Industries, Inc.) | 1.5 parts |

Those materials were added to a mixed solvent of 90 parts of methanol and 60 parts of 1-butanol to prepare a dispersion liquid. The dispersion liquid was subjected to dispersion treatment with a vertical sand mill using glass beads each having a diameter of 1.0 mm for 6 hours. The dispersion liquid subjected to the sand mill dispersion treatment was then further subjected to dispersion treatment with an ultrasonic disperser (UT-205, manufactured by Sharp Corporation) for 1 hour to prepare a coating liquid 3 for an undercoat layer. The output of the ultrasonic disperser was set to 100%. In addition, media such as glass beads were not used in this dispersion treatment.

[Preparation Example of Coating Liquid 4 for Undercoat Layer]

A coating liquid 4 for an undercoat layer was prepared in the same manner as the coating liquid 2 for an undercoat layer except that in the preparation example of the coating liquid 2 for an undercoat layer, the sand mill dispersion treatment time was changed to 4 hours.

[Preparation Example of Coating Liquid 5 for Undercoat Layer]

100 Parts of rutile-type titanium oxide particles (average primary particle diameter: 35 nm, manufactured by Tayca Corporation) were stirred and mixed with 500 parts of toluene, and 4.32 parts of methyldimethoxysilane ("TSL8117" manufactured by Toshiba Silicone Co., Ltd.) was further added to the mixture, followed by stirring for 8 hours. After that, toluene was evaporated by distillation under reduced pressure, and the residue was dried at 120° C. for 3 hours. Thus, rutile-type titanium oxide particles whose surfaces had already been treated with methyldimethoxysilane were obtained.

Subsequently, the following materials were prepared.

| | |
|---|---|
| The rutile-type titanium oxide particles whose surfaces have already been treated with methyldimethoxysilane | 12 parts |
| N-methoxymethylated nylon (product name: TORESIN EF-30T, manufactured by Nagase ChemteX Corporation) | 4.5 parts |
| Copolymerized nylon resin (product name: AMILAN CM8000, manufactured by Toray Industries, Inc.) | 1.5 parts |

Those materials were added to a mixed solvent of 90 parts of methanol and 60 parts of 1-butanol to prepare a dispersion liquid. The dispersion liquid was subjected to dispersion treatment with a vertical sand mill using glass beads each having a diameter of 1.0 mm for 6 hours. The liquid subjected to the sand mill dispersion treatment was then further subjected to dispersion treatment with an ultrasonic disperser (UT-205, manufactured by Sharp Corporation) for 1 hour to prepare a coating liquid 5 for an undercoat layer. The output of the ultrasonic disperser was set to 100%. In addition, media such as glass beads were not used in this dispersion treatment.

[Preparation Example of Coating Liquid 6 for Undercoat Layer]

A coating liquid 6 for an undercoat layer was prepared in the same manner as the coating liquid 5 for an undercoat layer except that in the preparation example of the coating liquid 5 for an undercoat layer, the sand mill dispersion treatment time was changed to 4 hours.

[Preparation Example of Coating Liquid 7 for Undercoat Layer]

100 Parts of rutile-type titanium oxide particles (average primary particle diameter: 80 nm, manufactured by Tayca Corporation) were stirred and mixed with 500 parts of toluene, and 1.8 parts of methyldimethoxysilane ("TSL8117" manufactured by Toshiba Silicone Co., Ltd.) was further added to the mixture, followed by stirring for 8 hours. After that, toluene was evaporated by distillation under reduced pressure, and the residue was dried at 120° C. for 3 hours. Thus, rutile-type titanium oxide particles whose surfaces had already been treated with methyldimethoxysilane were obtained.

Subsequently, the following materials were prepared.

| | |
|---|---|
| The rutile-type titanium oxide particles whose surfaces have already been treated with methyldimethoxysilane | 18 parts |
| N-methoxymethylated nylon (product name: TORESIN EF-30T, manufactured by Nagase ChemteX Corporation) | 4.5 parts |
| Copolymerized nylon resin (product name: AMILAN CM8000, manufactured by Toray Industries, Inc.) | 1.5 parts |

Those materials were added to a mixed solvent of 90 parts of methanol and 60 parts of 1-butanol to prepare a dispersion liquid. The dispersion liquid was subjected to dispersion treatment with a vertical sand mill using glass beads each having a diameter of 1.0 mm for 6 hours. The liquid subjected to the sand mill dispersion treatment was then further subjected to dispersion treatment with an ultrasonic disperser (UT-205, manufactured by Sharp Corporation) for 1 hour to prepare a coating liquid 7 for an undercoat layer. The output of the ultrasonic disperser was set to 100%. In addition, media such as glass beads were not used in this dispersion treatment.

[Preparation Example of Coating Liquid 8 for Undercoat Layer]

A coating liquid 8 for an undercoat layer was prepared in the same manner as the coating liquid 7 for an undercoat layer except that in the preparation example of the coating liquid 7 for an undercoat layer, the sand mill dispersion treatment time was changed to 4 hours.

[Preparation Example of Coating Liquid 9 for Undercoat Layer]

100 Parts of rutile-type titanium oxide particles (average primary particle diameter: 120 nm, manufactured by Tayca Corporation) were stirred and mixed with 500 parts of toluene, and 1.8 parts of methyldimethoxysilane ("TSL8117" manufactured by Toshiba Silicone Co., Ltd.) was further added to the mixture, followed by stirring for 8 hours. After that, toluene was evaporated by distillation under reduced pressure, and the residue was dried at 120° C. for 3 hours. Thus, rutile-type titanium oxide particles whose surfaces had already been treated with methyldimethoxysilane were obtained.

Subsequently, the following materials were prepared.

| | |
|---|---|
| The rutile-type titanium oxide particles whose surfaces have already been treated with methyldimethoxysilane | 18 parts |
| N-methoxymethylated nylon (product name: TORESIN EF-30T, manufactured by Nagase ChemteX Corporation) | 4.5 parts |
| Copolymerized nylon resin (product name: AMILAN CM8000, manufactured by Toray Industries, Inc.) | 1.5 parts |

Those materials were added to a mixed solvent of 90 parts of methanol and 60 parts of 1-butanol to prepare a dispersion liquid. The dispersion liquid was subjected to dispersion treatment with a vertical sand mill using glass beads each having a diameter of 1.0 mm for 6 hours. The liquid subjected to the sand mill dispersion treatment was then further subjected to dispersion treatment with an ultrasonic disperser (UT-205, manufactured by Sharp Corporation) for 1 hour to prepare a coating liquid 9 for an undercoat layer. The output of the ultrasonic disperser was set to 100%. In addition, media such as glass beads were not used in this dispersion treatment.

[Preparation Example of Coating Liquid 10 for Undercoat Layer]

A coating liquid 10 for an undercoat layer was prepared in the same manner as the coating liquid 1 for an undercoat layer except that in the preparation example of the coating liquid 1 for an undercoat layer, methyldimethoxysilane was changed to vinyltrimethoxysilane (product name: KBM-1003, manufactured by Shin-Etsu Chemical Co., Ltd.).

[Preparation Example of Coating Liquid 11 for Undercoat Layer]

A coating liquid 11 for an undercoat layer was prepared in the same manner as the coating liquid 10 for an undercoat layer except that in the preparation example of the coating liquid 10 for an undercoat layer, the sand mill dispersion treatment time was changed to 4 hours.

[Preparation Example of Coating Liquid 12 for Undercoat Layer]

The following materials were prepared.

| | |
|---|---|
| Rutile-type titanium oxide particles (average primary particle diameter: 50 nm, manufactured by Tayca Corporation) | 18 parts |
| N-methoxymethylated nylon (product name: TORESIN EF-30T, manufactured by Nagase ChemteX Corporation) | 4.5 parts |
| Copolymerized nylon resin (product name: AMILAN CM8000, manufactured by Toray Industries, Inc.) | 1.5 parts |

Those materials were added to a mixed solvent of 90 parts of methanol and 60 parts of 1-butanol to prepare a dispersion liquid. The dispersion liquid was subjected to dispersion treatment with a vertical sand mill using glass beads each having a diameter of 1.0 mm for 6 hours. The liquid subjected to the sand mill dispersion treatment as described above was then further subjected to dispersion treatment with an ultrasonic disperser (UT-205, manufactured by Sharp Corporation) for 1 hour to prepare a coating liquid 12 for an undercoat layer. The output of the ultrasonic disperser was set to 100%. In addition, media such as glass beads were not used in this dispersion treatment.

[Preparation Example of Coating Liquid 13 for Undercoat Layer]

25 Parts of N-methoxymethylated nylon 6 (product name: TORESIN EF-30T, manufactured by Nagase ChemteX Corporation) was dissolved in 480 parts of a methanol/n-butanol=2/1 mixed solution by being heated to 65° C. After that, the thus obtained solution was cooled to room temperature. After that, the solution obtained by the cooling was filtered with a membrane filter (product name: FP-022, pore diameter: 0.22 μm, manufactured by Sumitomo Electric Industries, Ltd.) to prepare a coating liquid 13 for an undercoat layer.

[Synthesis of Phthalocyanine Pigment]

Synthesis Example 1

Under a nitrogen flow atmosphere, 5.46 parts of orthophthalonitrile and 45 parts of α-chloronaphthalene were loaded into a reaction vessel. After that, the temperature of the mixture was increased to 30° C. by its heating, and the temperature was kept at 30° C. Next, 3.75 parts of gallium trichloride was loaded into the reaction vessel at the temperature of 30° C. The moisture concentration of the mixed liquid in the reaction vessel at the time of the loading was 150 ppm. After that, the temperature in the reaction vessel was increased to 200° C. Next, under a nitrogen flow atmosphere, the resultant was subjected to a reaction at a temperature of 200° C. for 4.5 hours, and was then cooled. When the temperature reached 150° C., the product was filtered. The resultant filtered product was dispersed in and washed with N,N-dimethylformamide at a temperature of 140° C. for 2 hours, and was then filtered. The resultant filtered product was washed with methanol, and was then dried to provide a chlorogallium phthalocyanine pigment in a yield of 71%.

Synthesis Example 2

4.65 Parts of the chlorogallium phthalocyanine pigment obtained in Synthesis Example 1 described above was dissolved in 139.5 parts of concentrated sulfuric acid at a temperature of 10° C. The resultant solution was dropped into 620 parts of ice water under stirring to be reprecipitated. The solution containing the precipitate was filtered under reduced pressure with a filter press. At this time, No. 5C (manufactured by Advantec) was used as a filter. The resultant filtered product was dispersed in and washed with 2% ammonia water for 30 minutes, and was then filtered with the filter press. Next, the resultant filtered product was dispersed in and washed with ion-exchanged water, and was then repeatedly filtered with the filter press three times. Finally, the resultant was freeze-dried to provide a hydroxygallium phthalocyanine pigment (water-containing hydroxygallium phthalocyanine pigment) having a solid content of 23% in a yield of 97%.

Synthesis Example 3

6.6 Kilograms of the hydroxygallium phthalocyanine pigment obtained in Synthesis Example 2 described above was dried with a hyper-dry dryer (product name: HD-06R, frequency (oscillation frequency): 2,455 MHz±15 MHz, manufactured by Biocon (Japan) Ltd.) as described below.

The hydroxygallium phthalocyanine pigment was placed under the state of a lump (water-containing cake thickness: 4 cm or less) immediately after its removal from the filter press on a dedicated circular plastic tray, and the dryer was set so that far infrared rays were turned off, and the temperature of the inner wall of the dryer became 50° C. Then, when the pigment was irradiated with a microwave, the vacuum pump and leak valve of the dryer were adjusted to adjust the vacuum degree thereof to a range of from 4.0 to 10.0 kPa.

First, as a first step, the hydroxygallium phthalocyanine pigment was irradiated with a microwave having an output of 4.8 kW for 50 minutes. Next, the microwave was temporarily turned off, and the leak valve was temporarily closed to achieve a high vacuum of 2 kPa or less. The solid content of the hydroxygallium phthalocyanine pigment at this time point was 88%.

As a second step, the leak valve was adjusted to adjust the vacuum degree (pressure in the dryer) to the range of the above-mentioned preset values (4.0 to 10.0 kPa). After that, the hydroxygallium phthalocyanine pigment was irradiated with a microwave having an output of 1.2 kW for 5 minutes. In addition, the microwave was temporarily turned off, and the leak valve was temporarily closed to achieve a high vacuum of 2 kPa or less. The second step was repeated once more (twice in total). The solid content of the hydroxygallium phthalocyanine pigment at this time point was 98%.

Further, as a third step, microwave irradiation was performed in the same manner as in the second step except that the output of the microwave in the second step was changed from 1.2 kW to 0.8 kW. The third step was repeated once more (twice in total).

Further, as a fourth step, the leak valve was adjusted to return the vacuum degree (pressure in the dryer) to the range of the above-mentioned preset values (4.0 to 10.0 kPa). After that, the hydroxygallium phthalocyanine pigment was irradiated with a microwave having an output of 0.4 kW for 3 minutes. In addition, the microwave was temporarily turned off, and the leak valve was temporarily closed to achieve a high vacuum of 2 kPa or less. The fourth step was repeated seven more times (eight times in total).

Thus, 1.52 kg of a hydroxygallium phthalocyanine pigment (crystal) having a water content of 1% or less was obtained within a total of 3 hours.

Synthesis Example 4

In 100 g of α-chloronaphthalene, 5.0 g of o-phthalodinitrile and 2.0 g of titanium tetrachloride were heated and stirred at 200° C. for 3 hours, and were then cooled to 50° C. A crystal precipitated by the cooling was separated by filtration to provide a paste of dichlorotitanium phthalocyanine. Next, the resultant paste was stirred and washed with 100 mL of N,N-dimethylformamide heated to 100° C., and was then repeatedly washed twice with 100 mL of methanol at 60° C., followed by separation by filtration. Further, a paste obtained by the separation by filtration was stirred in 100 mL of deionized water at 80° C. for 1 hour, and was separated by filtration to provide 4.3 g of a blue titanyl phthalocyanine pigment.

Next, the resultant blue titanyl phthalocyanine pigment was dissolved in 30 mL of concentrated sulfuric acid, and the solution was dropped into 300 mL of deionized water at 20° C. under stirring to be reprecipitated. After that, the solution containing the precipitate was filtered and sufficiently washed with water to provide an amorphous titanyl phthalocyanine pigment. 4.0 Grams of the amorphous titanyl phthalocyanine pigment was suspended and stirred in 100 mL of methanol under room temperature (22° C.) for 8 hours. After that, the resultant was separated by filtration and dried under reduced pressure to provide a titanyl phthalocyanine pigment having low crystallinity.

Synthesis Example 5

Under a nitrogen flow atmosphere, 10 g of gallium trichloride and 29.1 g of orthophthalonitrile were added to 100 mL of α-chloronaphthalene, and the mixture was subjected to a reaction at a temperature of 200° C. for 24 hours, followed by filtration of the product. The resultant filtered product was heated and stirred using N,N-dimethylformamide at a temperature of 150° C. for 30 minutes, followed by filtration. The resultant filtered product was washed with methanol, and was then dried to provide a chlorogallium phthalocyanine pigment in a yield of 83%.

2 Parts of the chlorogallium phthalocyanine pigment obtained by the above-mentioned method was dissolved in 50 parts of concentrated sulfuric acid, and the whole was stirred for 2 hours. After that, the thus obtained solution was dropped into an ice-cooled mixed solution of 170 mL of distilled water and 66 mL of concentrated aqueous ammonia to be reprecipitated. The solution containing the precipitate was sufficiently washed with distilled water, and was dried to provide 1.8 parts of a hydroxygallium phthalocyanine pigment.

[Preparation Example of Coating Liquid 1 for Charge Generating Layer]

The following materials were prepared.

| | |
|---|---|
| The hydroxygallium phthalocyanine pigment obtained in Synthesis Example 3 | 0.5 part |
| N-Methylformamide (product code: F0059, manufactured by Tokyo Chemical Industry Co., Ltd.) | 9.5 parts |
| Glass beads each having a diameter of 0.9 mm | 15 parts |

Those materials were subjected to milling treatment with a paint shaker (manufactured by Toyo Seiki Seisaku-sho, Ltd.) under room temperature (23° C.) for 6 hours (first stage). At this time, a standard bottle (product name: PS-6, manufactured by Hakuyo Glass Co., Ltd.) was used as a container. The liquid subjected to the milling treatment was subjected to milling treatment with a ball mill under room temperature (23° C.) for 100 hours (second stage). At this time, the container was set as it was in the ball mill without the removal of the contents of the container, and the treatment was performed under such a condition that the container was rotated 120 times per minute. Accordingly, the same glass beads as those of the first stage were used in the second-stage milling treatment. The treated liquid was filtered with a filter (product number: N-NO. 125T, pore diameter: 133 μm, manufactured by NBC Meshtec Inc.) to remove the glass beads. 30 Parts of N-methylformamide was added to the solution after the filtration. After that, the mixture was filtered, and a product collected by filtration on a filter unit was sufficiently washed with tetrahydrofuran. Then, the washed product collected by filtration was dried in a vacuum to provide 0.46 part of a hydroxygallium phthalocyanine pigment.

The resultant hydroxygallium phthalocyanine pigment had peaks at the following positions in an X-ray diffraction spectrum using a CuKα ray. That is, the hydroxygallium phthalocyanine pigment had peaks at Bragg angles 2θ of 7.4°±0.3°, 9.9°±0.3°, 16.2°±0.3°, 18.6°±0.3°, 25.2°+0.3°, and 28.2°±0.3°.

In addition, the content of N-methylformamide in hydroxygallium phthalocyanine crystal particles estimated through $^1$H-NMR measurement was 1.9 mass % with respect to the content of hydroxygallium phthalocyanine.

Subsequently, the following materials were prepared.

| | |
|---|---|
| The hydroxygallium phthalocyanine pigment obtained in the milling treatment | 20 parts |
| Polyvinyl butyral (product name: S-LEC BX-1, manufactured by Sekisui Chemical Co., Ltd.) | 10 parts |
| Cyclohexanone | 190 parts |
| Glass beads each having a diameter of 0.9 mm | 482 parts |

Those materials were subjected to dispersion treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 4 hours. At this time, the treatment was performed under such a condition that the discs were rotated 1,800 times per minute. 444 Parts of cyclohexanone and 634 parts of ethyl acetate were added to the dispersion liquid to prepare a coating liquid 1 for a charge generating layer.

Measurement of the phthalocyanine pigment using small-angle X-ray scattering was performed by the following procedure.

First, the prepared coating liquid 1 for a charge generating layer was diluted by adding cyclohexanone thereto until the concentration of the charge generating substance became 1 mass %. Thus, a measurement sample was prepared.

The resultant measurement sample was subjected to small-angle X-ray scattering measurement (X-ray wavelength: 0.154 nm) through use of a multipurpose X-ray diffractometer SmartLab manufactured by Rigaku Corporation.

A scattering profile obtained through the measurement was analyzed with particle diameter analysis software NANO-Solver to provide a crystal particle size distribution. A particle shape was assumed to be a sphere.

According to the results of the measurement, the hydroxygallium phthalocyanine pigment contained in the coating liquid 1 for a charge generating layer had a peak at a position of 38 nm in the crystal particle size distribution measured using small-angle X-ray scattering, and the peak had a half width of 38 nm.

[Preparation Example of Coating Liquid 2 for Charge Generating Layer]

A coating liquid 2 for a charge generating layer was prepared in the same manner as the coating liquid 1 for a charge generating layer except that in the preparation example of the coating liquid 1 for a charge generating layer, the 100 hours of milling treatment with a ball mill in the second stage was changed to 1,000 hours thereof. The hydroxygallium phthalocyanine pigment contained in the coating liquid 2 for a charge generating layer had a peak at a position of 33 nm in a crystal particle size distribution measured using small-angle X-ray scattering, and the peak had a half width of 35 nm.

In addition, the content of N-methylformamide in hydroxygallium phthalocyanine crystal particles estimated through $^1$H-NMR measurement was 1.5 mass % with respect to the content of hydroxygallium phthalocyanine.

[Preparation Example of Coating Liquid 3 for Charge Generating Layer]

A coating liquid 3 for a charge generating layer was prepared in the same manner as the coating liquid 1 for a charge generating layer except that in the preparation example of the coating liquid 1 for a charge generating layer, the 100 hours of milling treatment with a ball mill in the second stage was changed to 2,000 hours thereof. The hydroxygallium phthalocyanine pigment contained in the coating liquid 3 for a charge generating layer had a peak at a position of 27 nm in a crystal particle size distribution measured using small-angle X-ray scattering, and the peak had a half width of 35 nm.

In addition, the content of N-methylformamide in hydroxygallium phthalocyanine crystal particles estimated through $^1$H-NMR measurement was 1.5 mass % with respect to the content of hydroxygallium phthalocyanine.

[Preparation Example of Coating Liquid 4 for Charge Generating Layer]

The following materials were prepared.

| | |
|---|---|
| The hydroxygallium phthalocyanine pigment obtained by the milling treatment in the preparation example of the coating liquid 3 for a charge generating layer | 25 parts |

-continued

| | |
|---|---|
| Polyvinyl butyral (product name: S-LEC BX-1, manufactured by Sekisui Chemical Co., Ltd.) | 5 parts |
| Cyclohexanone | 190 parts |

Those materials were placed in a container for centrifugation, and were subjected to centrifugation treatment with a high-speed refrigerated centrifuge (product name: himac CR22G, manufactured by Hitachi Koki Co. Ltd.) under a preset temperature of 18° C. for 30 minutes. At this time, the treatment was performed through use of, as a rotor, a product available under the product name: R14A (manufactured by Hitachi Koki Co. Ltd.) under the conditions of shortest acceleration and deceleration times and 1,800 revolutions per minute. The supernatant after the centrifugation was immediately collected in another container for centrifugation. The thus obtained solution was subjected to centrifugation treatment again in the same manner as in the foregoing except that the condition of 8,000 revolutions per minute was adopted. The supernatant after the centrifugation was removed, and the remaining solution was immediately collected in a separate sample bottle. A weight ratio between the hydroxygallium phthalocyanine pigment and polyvinyl butyral in the thus obtained solution was determined by $^{1}$H-NMR measurement. In addition, the solid content of the resultant solution was determined by a method involving drying with a dryer set to 150° C. for 30 minutes, and measurement of a difference between weights before and after the drying.

Subsequently, polyvinyl butyral (product name: S-LEC BX-1, manufactured by Sekisui Chemical Co., Ltd.) and cyclohexanone were added to the solution obtained by the centrifugation treatment. At this time, a weight ratio among the hydroxygallium phthalocyanine pigment, polyvinyl butyral, and cyclohexanone was set to 20:10:190 (hydroxygallium phthalocyanine pigment:polyvinyl butyral:cyclohexanone). 220 Parts of the resultant solution and 482 parts of glass beads each having a diameter of 0.9 mm were subjected to dispersion treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 4 hours. At this time, the treatment was performed under such a condition that the discs were rotated 1,800 times per minute. 444 Parts of cyclohexanone and 634 parts of ethyl acetate were added to the dispersion liquid to prepare a coating liquid 4 for a charge generating layer. The hydroxygallium phthalocyanine pigment contained in the coating liquid 4 for a charge generating layer had a peak at a position of 20 nm in a crystal particle size distribution measured using small-angle X-ray scattering, and the peak had a half width of 27 nm.

[Preparation Example of Coating Liquid 5 for Charge Generating Layer]

The hydroxygallium phthalocyanine pigment to be prepared before the centrifugation treatment in the preparation example of the coating liquid 4 for a charge generating layer was changed to a hydroxygallium phthalocyanine pigment obtained as described below. A coating liquid 5 for a charge generating layer was prepared in the same manner as in the preparation example of the coating liquid 4 for a charge generating layer except the foregoing.

First, the following materials were prepared.

| | |
|---|---|
| The hydroxygallium phthalocyanine pigment obtained in Synthesis Example 3 | 0.5 part |
| N-Methylformamide (product code: F0059, manufactured by Tokyo Chemical Industry Co., Ltd.) | 9.5 parts |
| Glass beads each having a diameter of 0.9 mm | 15 parts |

Those materials were subjected to milling treatment with a ball mill under room temperature (23° C.) for 100 hours. At this time, the treatment was performed through use of, as a container, a standard bottle (product name: PS-6, manufactured by Hakuyo Glass Co., Ltd.) under such a condition that the container was rotated 60 times per minute. The liquid obtained by the treatment was filtered with a filter (product number: N-NO. 125T, pore diameter: 133 μm, manufactured by NBC Meshtec Inc.) to remove the glass beads. 30 Parts of N-methylformamide was added to the resultant filtrate. After that, the mixture was filtered, and a product collected by filtration on a filter unit was sufficiently washed with tetrahydrofuran. Then, the washed product collected by filtration was dried in a vacuum to provide 0.45 part of a hydroxygallium phthalocyanine pigment.

The hydroxygallium phthalocyanine pigment obtained in the foregoing had peaks at the following positions in an X-ray diffraction spectrum using a CuKα ray. That is, the hydroxygallium phthalocyanine pigment obtained in the foregoing had peaks at Bragg angles 2θ of 7.4°±0.3°, 9.9°+0.3°, 16.2°+0.3°, 18.6°±0.3°, 25.2°±0.3°, and 28.2°±0.3°.

The hydroxygallium phthalocyanine pigment contained in the coating liquid 5 for a charge generating layer had a peak at a position of 41 nm in a crystal particle size distribution measured using small-angle X-ray scattering, and the peak had a half width of 40 nm. In addition, the content of N-methylformamide in hydroxygallium phthalocyanine crystal particles estimated through $^{1}$H-NMR measurement was 2.1 mass % with respect to the content of hydroxygallium phthalocyanine.

[Preparation Example of Coating Liquid 6 for Charge Generating Layer]

A coating liquid 6 for a charge generating layer was prepared in the same manner as the coating liquid 5 for a charge generating layer except that in the preparation example of the coating liquid 5 for a charge generating layer, the 100 hours of milling treatment with a ball mill was changed to 40 hours thereof. The hydroxygallium phthalocyanine pigment contained in the coating liquid 6 for a charge generating layer had a peak at a position of 55 nm in a crystal particle size distribution measured using small-angle X-ray scattering, and the peak had a half width of 49 nm.

[Preparation Example of Coating Liquid 7 for Charge Generating Layer]

A coating liquid 7 for a charge generating layer was prepared in the same manner as the coating liquid 1 for a charge generating layer except that in the preparation example of the coating liquid 1 for a charge generating layer, the step of obtaining the hydroxygallium phthalocyanine pigment was changed as described below.

First, the following materials were prepared.

| | |
|---|---|
| The hydroxygallium phthalocyanine pigment obtained in Synthesis Example 5 | 0.5 part |

-continued

| | |
|---|---|
| N,N-Dimethylformamide (product code: D0722, manufactured by Tokyo Chemical Industry Co., Ltd.) | 7.5 parts |
| Glass beads each having a diameter of 0.9 mm | 29 parts |

Those materials were subjected to milling treatment with a ball mill under a temperature of 25° C. for 24 hours. At this time, the treatment was performed through use of, as a container, a standard bottle (product name: PS-6, manufactured by Hakuyo Glass Co., Ltd.) under such a condition that the container was rotated 60 times per minute. The liquid obtained by the treatment was filtered with a filter (product number: N-NO. 125T, pore diameter: 133 μm, manufactured by NBC Meshtec Inc.) to remove the glass beads. 30 Parts of N,N-dimethylformamide was added to the resultant filtrate. After that, the mixture was filtered, and a product collected by filtration on a filter unit was sufficiently washed with n-butyl acetate. Then, the washed product collected by filtration was dried in a vacuum to provide 0.45 part of a hydroxygallium phthalocyanine pigment.

The hydroxygallium phthalocyanine pigment contained in the coating liquid 7 for a charge generating layer had a peak at a position of 60 nm in a crystal particle size distribution measured using small-angle X-ray scattering, and the peak had a half width of 58 nm.

[Preparation Example of Coating Liquid 8 for Charge Generating Layer]

The following materials were prepared.

| | |
|---|---|
| The titanyl phthalocyanine pigment obtained in Synthesis Example 4 | 0.5 part |
| Tetrahydrofuran | 10 parts |
| Glass beads each having a diameter of 0.9 mm | 15 parts |

Those materials were subjected to milling treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 48 hours. At this time, the treatment was performed under such a condition that the discs were rotated 500 times per minute. The liquid obtained by the treatment was filtered with a filter (item number: N-NO. 125T, pore diameter: 133 μm, manufactured by NBC Meshtec Inc.) to remove the glass beads. 30 Parts of tetrahydrofuran was added to the resultant filtrate. After that, the mixture was filtered, and a product collected by filtration on a filter unit was sufficiently washed with methanol and water. Then, the washed product collected by filtration was dried in a vacuum to provide 0.46 part of a titanyl phthalocyanine pigment. The resultant titanyl phthalocyanine pigment had peaks at Bragg angles 2θ° of 9.8°±0.3° and 27.1°±0.3° in an X-ray diffraction spectrum using a CuKα ray.

Subsequently, the following materials were prepared.

| | |
|---|---|
| The titanyl phthalocyanine pigment obtained by the milling treatment | 12 parts |
| Polyvinyl butyral (product name: S-LEC BX-1, manufactured by Sekisui Chemical Co., Ltd.) | 10 parts |
| Cyclohexanone | 139 parts |
| Glass beads each having a diameter of 0.9 mm | 354 parts |

Those materials were subjected to dispersion treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 4 hours. At this time, the treatment was performed under such a condition that the discs were rotated 1,800 times per minute. 326 Parts of cyclohexanone and 465 parts of ethyl acetate were added to the dispersion liquid to prepare a coating liquid 8 for a charge generating layer.

The titanyl phthalocyanine pigment contained in the coating liquid 8 for a charge generating layer had a peak at a position of 70 nm in a crystal particle size distribution measured using small-angle X-ray scattering, and the peak had a half width of 90 nm.

[Preparation Example of Coating Liquid 9 for Charge Generating Layer]

The following materials were prepared.

| | |
|---|---|
| Titanyl phthalocyanine pigment (CG-01H, manufactured by IT-Chemical Co., Ltd.) | 15 parts |
| Polyvinyl butyral (product name: S-LEC BX-1, manufactured by Sekisui Chemical Co., Ltd.) | 10 parts |
| Cyclohexanone | 139 parts |
| Glass beads each having a diameter of 0.9 mm | 354 parts |

Those materials were subjected to dispersion treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 4 hours. At this time, the treatment was performed under such a condition that the discs were rotated 1,800 times per minute. 326 Parts of cyclohexanone and 465 parts of ethyl acetate were added to the dispersion liquid to prepare a coating liquid 9 for a charge generating layer.

The titanyl phthalocyanine pigment contained in the coating liquid 9 for a charge generating layer had a peak at a position of 100 nm in a crystal particle size distribution measured using small-angle X-ray scattering, and the peak had a half width of 140 nm.

[Preparation Example of Coating Liquid 1 for Charge Transporting Layer]

The following materials were prepared.

| | |
|---|---|
| Triarylamine compound represented by the following formula (A1), serving as a charge transporting substance | 5 parts |
| Triarylamine compound represented by the following formula (A2), serving as a charge transporting substance | 5 parts |
| Polycarbonate (product name: IUPILON Z-400, manufactured by Mitsubishi Engineering-Plastics Corporation) | 10 parts |

(A1)

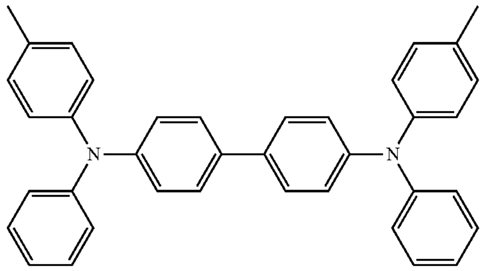

-continued (A2)

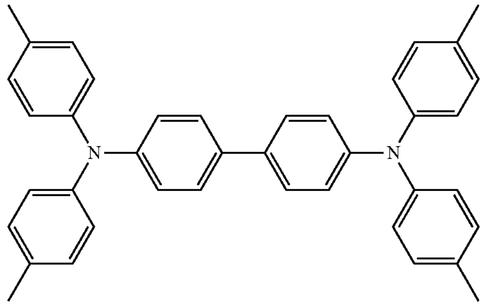

Those materials were dissolved in a mixed solvent of 25 parts of orthoxylene, 25 parts of methyl benzoate, and 25 parts of dimethoxymethane to prepare a coating liquid 1 for a charge transporting layer.

[Preparation Example of Coating Liquid 2 for Charge Transporting Layer]

The following materials were prepared.

| | |
|---|---|
| Charge transporting substance represented by the following formula (A10), serving as a charge transporting substance | 90 parts |
| Polyarylate resin having a structural unit represented by the following formula (A11) and a structural unit represented by the following formula (A12) at a ratio of 5:5, and having a weight-average molecular weight of 100,000 | 100 parts |

(A10)

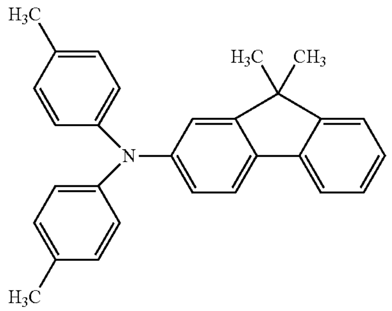

-continued (A11)

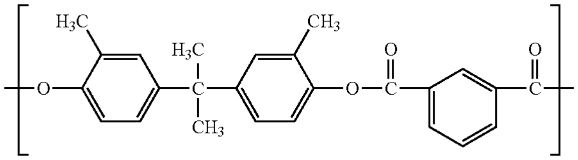

(A12)

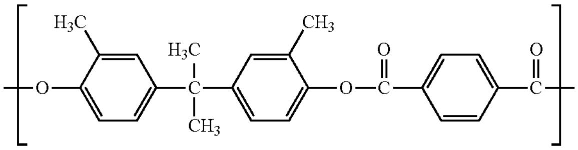

Those materials were dissolved in a mixed solvent of 300 parts of dimethoxymethane and 700 parts of chlorobenzene to prepare a coating liquid 2 for a charge transporting layer.

[Preparation Example of Coating Liquid 3 for Charge Transporting Layer]

The following materials were prepared.

| | |
|---|---|
| Charge transporting substance represented by the following formula (A14), serving as a charge transporting substance | 50 parts |
| Polycarbonate resin having a structural unit represented by the following formula (A15) and a structural unit represented by the following formula (A16) as repeating units at a ratio of 51 mol %:49 mol %, and having a terminal structure derived from p-t-butylphenol | 100 parts |
| 2,6-Di-t-butyl-4-methylphenol | 8 parts |
| Silicone oil (product name: KF96, manufactured by Shin-Etsu Chemical Co., Ltd.) | 0.03 part |

(A14)

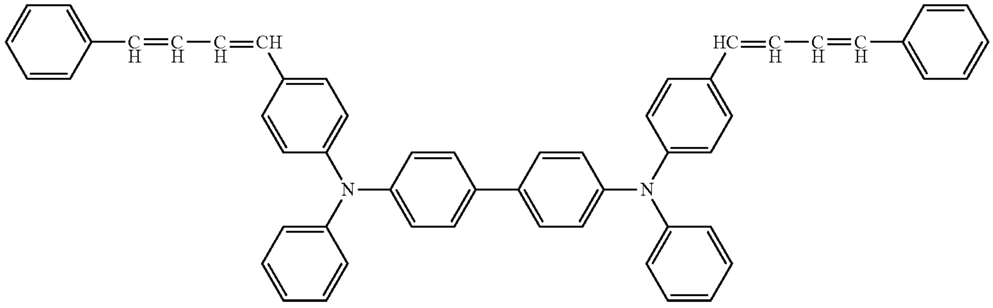

-continued (A15)

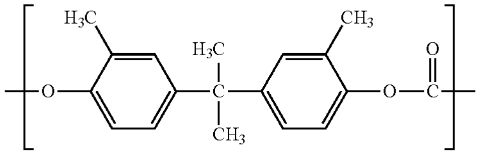

(A16)

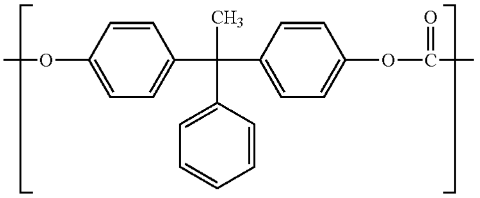

Those materials were dissolved in 640 parts of a mixed solvent of tetrahydrofuran and toluene (weight ratio: 8/2) to prepare a coating liquid 3 for a charge transporting layer.

[Preparation Example of Coating Liquid 1 for Protection Layer]

The following materials were prepared.

| | |
|---|---|
| Compound represented by the following formula (4-1) | 24 parts |
| Siloxane-modified acrylic compound (SYMAC US-270, manufactured by Toagosei Co., Ltd.) | 1.2 parts |

Those materials were mixed with a mixed solvent of 42 parts of cyclohexane and 18 parts of 1-propanol, and the mixture was stirred to prepare a coating liquid 1 for a protection layer.

(4-1)

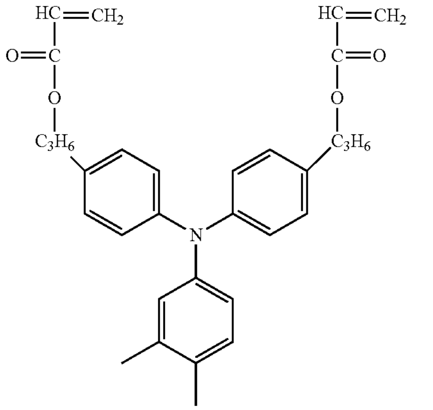

[Electrophotographic Photosensitive Member Production Example 1]

<Support>

An aluminum cylinder having a diameter of 30 mm and a length of 260.5 mm was used as a support (cylindrical support).

<Electroconductive Layer>

Anatase-type titanium oxide having an average primary particle diameter of 200 nm was used as a base. In addition, a titanium-niobium sulfuric acid solution containing 33.7 parts of titanium in terms of $TiO_2$ and 2.9 parts of niobium in terms of $Nb_2O_5$ was prepared.

100 Parts of the base was dispersed in pure water to provide 1,000 parts of a suspension, and the suspension was warmed to 60° C. The titanium-niobium sulfuric acid solution and 10 mol/L sodium hydroxide were dropped into the suspension over 3 hours so that the pH of the suspension became 2 to 3. After the total amount of the solutions had been dropped, the pH was adjusted to a value near a neutral region, and a polyacrylamide-based flocculant was added to the mixture to sediment a solid content. The supernatant was removed, and the residue was filtered and washed, followed by drying at 110° C. Thus, an intermediate containing 0.1 mass % of organic matter derived from the flocculant in terms of C was obtained. The intermediate was calcined in nitrogen at 750° C. for 1 hour, and was then calcined in air at 450° C. to produce titanium oxide particles. The resultant titanium oxide particles had an average particle diameter (average primary particle diameter) of 220 nm, which was determined by a particle diameter measurement method involving using a scanning electron microscope.

Subsequently, 50 parts of a phenol resin serving as a binding material was dissolved in 35 parts of 1-methoxy-2-propanol serving as a solvent to provide a solution. A commercially available product that was a mixture of a monomer and oligomer of a phenol resin (product name: PLYOPHEN J-325, manufactured by DIC Corporation, resin solid content: 60%, density after curing: 1.3 g/cm$^3$) was used as the phenol resin.

60 Parts of the titanium oxide particles were added to the solution. The mixture was loaded into a vertical sand mill using 120 parts of glass beads having an average particle diameter of 1.0 mm as a dispersion medium, and was subjected to dispersion treatment under the conditions of a dispersion liquid temperature of 23±3° C. and a number of revolutions of 1,500 rpm (peripheral speed: 5.5 m/s) for 4 hours to provide a dispersion liquid. The glass beads were removed from the dispersion liquid with a mesh.

Subsequently, the following materials were prepared.

| | |
|---|---|
| Silicone oil serving as a leveling agent (product name: SH28 PAINT ADDITIVE, manufactured by Dow Corning Toray Co., Ltd.) | 0.01 part |
| Silicone resin particles serving as a surface roughness-imparting material (product name: KMP-590, manufactured by Shin-Etsu Chemical Co., Ltd., average particle diameter: 2 μm, density: 1.3 g/cm$^3$) | 8 parts |

Those materials were added to the dispersion liquid after the removal of the glass beads, and the mixture was stirred and filtered under pressure with PTFE filter paper (product name: PF060, manufactured by Advantec Toyo Kaisha, Ltd.) to prepare a coating liquid for an electroconductive layer.

The thus prepared coating liquid for an electroconductive layer was applied onto the above-mentioned support by dip coating to form a coat, and the coat was heated at 150° C. for 20 minutes to be cured, to thereby form an electroconductive layer having a thickness of 25 μm.

<Undercoat Layer>

The coating liquid 1 for an undercoat layer was applied onto the above-mentioned electroconductive layer by dip coating to form a coat, and the coat was dried by heating at a temperature of 100° C. for 10 minutes to form an undercoat layer having a thickness of 2 μm.

<Charge Generating Layer>

The coating liquid 1 for a charge generating layer was applied onto the above-mentioned undercoat layer by dip coating to form a coat, and the coat was dried by heating at a temperature of 100° C. for 10 minutes to form a charge generating layer having a thickness of 0.2 μm.

<Charge Transporting Layer>

The coating liquid 1 for a charge transporting layer was applied onto the above-mentioned charge generating layer by dip coating to form a coat, and the coat was dried by heating at a temperature of 120° C. for 30 minutes to form a charge transporting layer having a thickness of 14 μm.

Thus, an electrophotographic photosensitive member 1 was obtained.

[Evaluation 1]

For the electrophotographic photosensitive member 1 obtained in Electrophotographic Photosensitive Member Production Example 1, the following measurement and analysis were performed to calculate constants A, "m", and r.

Figure 5:
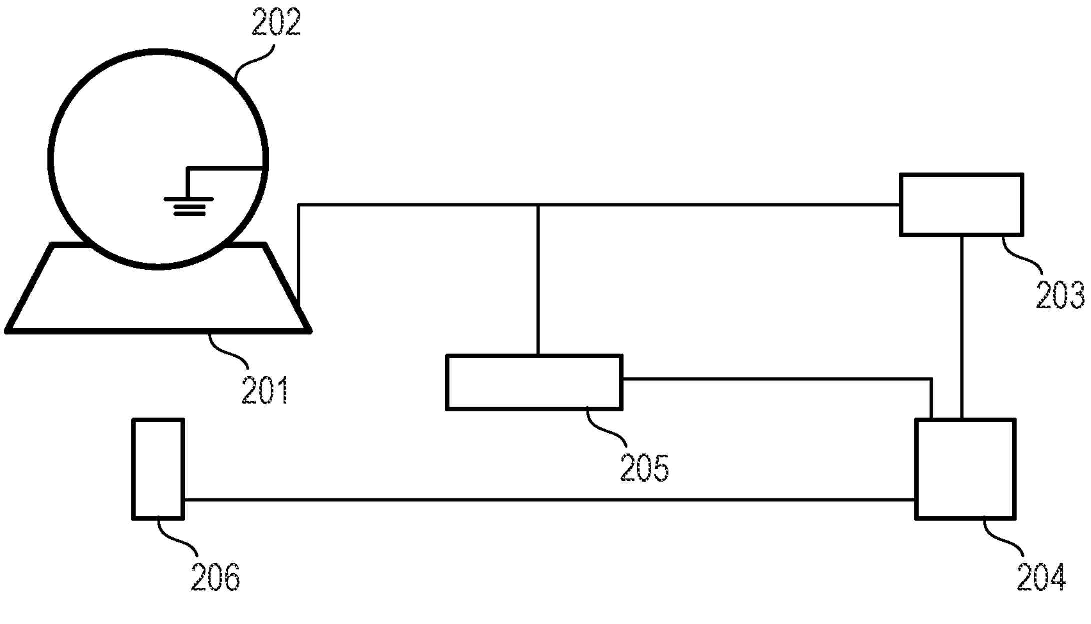
FIG. 5 is a view for schematically illustrating an evaluation apparatus used for evaluation in Examples.

A measurement apparatus illustrated in FIG. 5 was prepared. A transparent glass 201 having a transparent electrode deposited from the vapor on the surface thereof is prepared, and an electrophotographic photosensitive member 202 is placed thereon so as to achieve electrical conduction. The electrophotographic photosensitive member 202 is connected to ground via its support. The electrophotographic photosensitive member is connected to a power source 203 via the transparent glass 201 and a conducting wire, and a voltage can be applied to the electrophotographic photosensitive member 202 by issuing a command from a computer 204 for control. In addition, the electrophotographic photosensitive member 202 is also connected to a high-speed potentiometer 205 via the transparent glass 201 and a conducting wire, and the potential of the surface of the electrophotographic photosensitive member 202 brought into contact with the transparent glass 201 can be instantly read. The surface of the electrophotographic photosensitive member 202 can be irradiated with light from the back side of the transparent glass 201 by a light source 206. The electrophotographic photosensitive member 202 that has been charged is irradiated with light from the light source 206, and a change in potential at that time can be read with the high-speed potentiometer 205.

Through use of the measurement apparatus illustrated in FIG. 5, the characteristics of the electrophotographic photosensitive member were defined under the following conditions:

(1) the electrophotographic photosensitive member 202 is charged for 0.005 second;

(2) the absolute value of the charging potential obtained through measurement after 0.06 second from the start of the charging in (1) is represented by $V_d$ [V]; (3) the electrophotographic photosensitive member 202 is charged for 0.005 second so that the absolute value of the charging potential becomes the $V_d$ again after 0.18 second from the start of the charging in (1);

(4) exposure is performed with light having a wavelength of 805 [nm] and a light amount of 0.5 [μJ/cm$^2$] using the light source 206 after 0.02 second from the start of the charging in (3);

(5) the absolute value of the charging potential obtained through measurement after 0.06 second from the start of the charging in (3) is defined as a residual potential $V_r$ [V];

(6) while the $V_d$ is changed from 100 V to 1,000 V at intervals of 50 V, the procedures (1) to (5) are repeatedly performed to measure the $V_r$ corresponding to each value of the $V_d$; and (7) A graph obtained by plotting the $V_d$ and the $V_r$ obtained in (6) with a horizontal axis representing the $V_d$ and a vertical axis representing the $V_r$ is approximated by the following equation (E-1) to determine constants A, "m", and τ in the following equation (E-1).

$$V_r = A + 1000m\frac{1-e^{\frac{V_d}{\tau}}}{1-e^{\frac{1000}{\tau}}} \tag{E-1}$$

In the characteristic evaluation of an electrophotographic photosensitive member in the related art, an electrophotographic apparatus is reconstructed to measure the charging potential of the electrophotographic photosensitive member in many cases. In those cases, the exposure position of the electrophotographic photosensitive member is different from its potential measurement position, and hence before its exposed portion reaches the potential measurement position from the exposure position, a reduction in potential due to dark decay occurs. Accordingly, the residual potential $V_r$ is measured with an absolute value smaller than that of the potential at the moment of exposure. At this time, as the process speed of the electrophotographic apparatus becomes higher, the temporal difference becomes smaller and the dark decay also becomes smaller. The characteristic evaluation method for the electrophotographic photosensitive member in this Example is capable of measuring the charging potential of the electrophotographic photosensitive member without any temporal difference, and hence may be conceived to be an apparatus capable of performing measurement under the most severe condition with the process speed of the electrophotographic apparatus being maximized.

[Electrophotographic Photosensitive Member Production Example 2]

An electrophotographic photosensitive member was produced in the same manner as in Electrophotographic Photosensitive Member Production Example 1 except that in Electrophotographic Photosensitive Member Production Example 1, the undercoat layer was formed on the support without the arrangement of the electroconductive layer.

[Electrophotographic Photosensitive Member Production Example 3]

In Electrophotographic Photosensitive Member Production Example 1, the coating liquid 1 for a protection layer was applied onto the charge transporting layer of Electrophotographic Photosensitive Member Production Example 1 by dip coating to form a coat under the following conditions. An electrophotographic photosensitive member was produced in the same manner as in Electrophotographic Photosensitive Member Production Example 1 except the foregoing.

The coating liquid 1 for a protection layer was applied onto the charge transporting layer by dip coating to form a coat, and the resultant coat was dried at 35° C. for 4 minutes. After that, under a nitrogen atmosphere, the coat was irradiated with electron beams for 4.8 seconds under the conditions of an acceleration voltage of 57 kV and a beam current of 5.3 mA while a distance between the support (irradiation target body) and an electron beam irradiation window was set to 25 mm, and the support (irradiation target body) was rotated at a speed of 300 rpm. The absorbed dose of the electron beams at this time was measured to be 20 kGy. After that, under the nitrogen atmosphere, the temperature was increased from 25° C. to 137° C. over 10 seconds to perform the heating of the coat. An oxygen concentration during a time period from the electron beam irradiation to the subsequent heating treatment was 10 ppm or less. Next, in the air, the coat was naturally cooled until its temperature became 25° C., and heating treatment was performed for 10 minutes under such a condition that the temperature of the coat became 100° C. Thus, a protection layer having a thickness of 3.0 μm was formed.

[Electrophotographic Photosensitive Member Production Examples 3 to 29]

With respect to Electrophotographic Photosensitive Member Production Example 1, the presence or absence of the electroconductive layer; the kinds of the respective coating liquids used for the formation of the undercoat layer, the charge generating layer, and the charge transporting layer and the thicknesses of the respective layers; and the presence or absence and thickness of the protection layer were changed as shown in Table 1. Electrophotographic photosensitive members were produced in the same manner as in Electrophotographic Photosensitive Member Production Example 1 except the foregoing.

TABLE 1

| | Electro-conductive layer | Undercoat layer | | | Charge generating layer | | | |
|---|---|---|---|---|---|---|---|---|
| Electrophotographic photosensitive member No. | Coating liquid No. | Coating liquid No. | Particle diameter (nm) | Thick-ness (μm) | Coating liquid No | Thickness (μm) | Small-angle X-ray scattering peak position (nm) | Small-angle X-ray scattering peak half width (nm) |
| Electrophotographic photosensitive member 1 | 1 | 1 | 50 | 2.0 | 1 | 0.2 | 38 | 38 |
| Electrophotographic photosensitive member 2 | None | 1 | 50 | 2.0 | 1 | 0.2 | 38 | 38 |
| Electrophotographic photosensitive member 3 | 1 | 1 | 50 | 2.0 | 1 | 0.2 | 38 | 38 |
| Electrophotographic photosensitive member 4 | 1 | 1 | 50 | 2.0 | 1 | 0.2 | 38 | 38 |
| Electrophotographic photosensitive member 5 | 1 | 1 | 50 | 2.0 | 1 | 0.2 | 38 | 38 |
| Electrophotographic photosensitive member 6 | 1 | 1 | 50 | 2.0 | 1 | 0.2 | 38 | 38 |
| Electrophotographic photosensitive member 7 | 1 | 1 | 50 | 2.0 | 1 | 0.1 | 38 | 38 |
| Electrophotographic photosensitive member 8 | 1 | 1 | 50 | 5.0 | 1 | 0.2 | 38 | 38 |
| Electrophotographic photosensitive member 9 | 1 | 3 | 15 | 2.0 | 1 | 0.2 | 38 | 38 |
| Electrophotographic photosensitive member 10 | 1 | 5 | 35 | 2.0 | 1 | 0.2 | 38 | 38 |
| Electrophotographic photosensitive member 11 | 1 | 7 | 80 | 2.0 | 1 | 0.2 | 38 | 38 |
| Electrophotographic photosensitive member 12 | 1 | 9 | 120 | 2.0 | 1 | 0.2 | 38 | 38 |
| Electrophotographic photosensitive member 13 | 1 | 1 | 50 | 2.0 | 1 | 0.16 | 38 | 38 |
| Electrophotographic photosensitive member 14 | 1 | 1 | 50 | 2.0 | 1 | 0.14 | 38 | 38 |
| Electrophotographic photosensitive member 15 | 1 | 1 | 50 | 2.0 | 1 | 0.12 | 38 | 38 |
| Electrophotographic photosensitive member 16 | 1 | 1 | 50 | 2.0 | 2 | 0.2 | 33 | 35 |
| Electrophotographic photosensitive member 17 | 1 | 1 | 50 | 2.0 | 3 | 0.2 | 27 | 35 |

TABLE 1-continued

| | | | | | | | | |
|---|---|---|---|---|---|---|---|---|
| Electrophotographic photosensitive member 18 | 1 | 1 | 50 | 2.0 | 4 | 0.2 | 20 | 27 |
| Electrophotographic photosensitive member 19 | 1 | 1 | 50 | 2.0 | 5 | 0.2 | 41 | 40 |
| Electrophotographic photosensitive member 20 | 1 | 1 | 50 | 2.0 | 6 | 0.2 | 55 | 49 |
| Electrophotographic photosensitive member 21 | 1 | 1 | 50 | 2.0 | 8 | 0.2 | 70 | 90 |
| Electrophotographic photosensitive member 22 | 1 | 1 | 50 | 2.0 | 9 | 0.2 | 100 | 140 |
| Electrophotographic photosensitive member 23 | 1 | 13 | — | 0.85 | 7 | 0.08 | 60 | 58 |
| Electrophotographic photosensitive member 24 | 1 | 13 | — | 0.85 | 7 | 0.08 | 60 | 58 |
| Electrophotographic photosensitive member 25 | 1 | 13 | — | 0.85 | 7 | 0.08 | 60 | 58 |
| Electrophotographic photosensitive member 26 | None | 1 | 50 | 1.1 | 9 | 0.4 | 100 | 140 |
| Electrophotographic photosensitive member 27 | None | 1 | 50 | 1.1 | 9 | 0.4 | 100 | 140 |
| Electrophotographic photosensitive member 28 | None | 1 | 50 | 1.1 | 9 | 0.4 | 100 | 140 |
| Electrophotographic photosensitive member 29 | None | 1 | 50 | 1.1 | 9 | 0.4 | 100 | 140 |

| | Charge transporting layer | | Protection layer | | | | |
|---|---|---|---|---|---|---|---|
| Electrophotographic photosensitive member No. | Coating liquid No. | Thickness (μm) | Coating liquid No. | Thickness (μm) | A | m × $10^{-2}$ | T × $10^{3}$ |
| Electrophotographic photosensitive member 1 | 1 | 14 | None | — | 4.1 | 0.7 | 6.7 |
| Electrophotographic photosensitive member 2 | 1 | 14 | None | — | 4.0 | 0.6 | 7.0 |
| Electrophotographic photosensitive member 3 | 1 | 11 | 1 | 3 | 4.0 | 2.0 | 6.6 |
| Electrophotographic photosensitive member 4 | 1 | 12.5 | 1 | 1.5 | 4.0 | 1.9 | 6.6 |
| Electrophotographic photosensitive member 5 | 1 | 17 | None | — | 4.0 | 1.9 | 6.7 |
| Electrophotographic photosensitive member 6 | 1 | 14 | 1 | 3 | 6.0 | 2.2 | 6.8 |
| Electrophotographic photosensitive member 7 | 1 | 15.5 | 1 | 1.5 | 6.0 | 1.9 | 6.7 |
| Electrophotographic photosensitive member 8 | 1 | 14 | None | — | 6.0 | 1.2 | 4.3 |
| Electrophotographic photosensitive member 9 | 1 | 14 | None | — | 4.2 | 1.0 | 6.7 |
| Electrophotographic photosensitive member 10 | 1 | 14 | None | — | 4.2 | 1.0 | 6.8 |
| Electrophotographic photosensitive member 11 | 1 | 14 | None | — | 5.0 | 1.1 | 4.9 |
| Electrophotographic photosensitive member 12 | 1 | 14 | None | — | 5.8 | 1.2 | 4.3 |

TABLE 1-continued

| | | | | | | | |
|---|---|---|---|---|---|---|---|
| Electrophotographic photosensitive member 13 | 1 | 14 | None | — | 4.6 | 2.9 | 5.4 |
| Electrophotographic photosensitive member 14 | 1 | 14 | None | — | 4.7 | 3.3 | 4.9 |
| Electrophotographic photosensitive member 15 | 1 | 14 | None | — | 4.8 | 3.7 | 4.4 |
| Electrophotographic photosensitive member 16 | 1 | 14 | None | — | 4.0 | 1.1 | 6.7 |
| Electrophotographic photosensitive member 17 | 1 | 14 | None | — | 4.1 | 1.2 | 6.5 |
| Electrophotographic photosensitive member 18 | 1 | 14 | None | — | 4.1 | 1.3 | 6.3 |
| Electrophotographic photosensitive member 19 | 1 | 14 | None | — | 4.2 | 1.5 | 6.3 |
| Electrophotographic photosensitive member 20 | 1 | 14 | None | — | 4.4 | 1.8 | 5.9 |
| Electrophotographic photosensitive member 21 | 1 | 14 | None | — | 7.8 | 3.7 | 4.5 |
| Electrophotographic photosensitive member 22 | 1 | 14 | None | — | 8.0 | 6.0 | 4.0 |
| Electrophotographic photosensitive member 23 | 2 | 20 | None | — | 42.0 | 23.5 | 0.8 |
| Electrophotographic photosensitive member 24 | 2 | 22 | None | — | 55.0 | 28.6 | 0.7 |
| Electrophotographic photosensitive member 25 | 2 | 24 | None | — | 65.0 | 38.2 | 0.7 |
| Electrophotographic photosensitive member 26 | 3 | 17 | None | — | 63.0 | 18.3 | 0.9 |
| Electrophotographic photosensitive member 27 | 3 | 20 | None | — | 67.0 | 20.8 | 0.9 |
| Electrophotographic photosensitive member 28 | 3 | 23 | None | — | 73.0 | 23.5 | 0.9 |
| Electrophotographic photosensitive member 29 | 3 | 25 | None | — | 83.0 | 28.0 | 0.9 |

Example 1

The electrophotographic photosensitive member 1 was mounted onto an electrophotographic apparatus X obtained by reconstructing a laser beam printer manufactured by Hewlett-Packard Company (product name: HP LaserJet Enterprise M612dn), and the resultant was used as an electrophotographic apparatus 1.

The electrophotographic apparatus X is capable of measuring the charging potential of the electrophotographic photosensitive member with a surface potentiometer. In addition, the electrophotographic apparatus X is mounted with a voltage application unit, a charge transfer amount detection unit, and a charging potential control unit. The voltage application unit is a unit configured to apply a DC voltage to a charging roller to cause discharge from the charging roller to the electrophotographic photosensitive member 1. In addition, the charge transfer amount detection unit is a unit configured to detect a charge transfer amount per unit time resulting from the discharge from the charging roller to the electrophotographic photosensitive member. In addition, the charging potential control unit calculates a discharge start voltage $V_{th}$ and the slope of the charge transfer amount with respect to the DC voltage based on information on the charge transfer amount per unit time detected. The charging potential control unit further calculates a control DC voltage $V_{DC1}$ with respect to a control target value $V_{td}$ of the charging potential based on the calculation results, and feeds the result back to the voltage application unit.

A minimum detectable charge transfer amount $I_{min}$ per unit time in the electrophotographic apparatus X was measured by such a method as described below.

A specific procedure of the $I_{min}$ measurement method is described below.

First, the charge transfer amount detection unit is connected between a contact point A between a process cartridge and the charging roller, and a charging high-voltage contact point B between the process cartridge and the main body of the electrophotographic apparatus X (referring to a contact point for supplying a voltage from a high-voltage power source built into the main body of the electrophotographic apparatus to the process cartridge). Then, insulation is established between the contact point A and the charging high-voltage contact point B so that a current flows via the charge transfer amount detection unit. Thus, a current amount that is a charge transfer amount flowing from the charging roller to the electrophotographic photosensitive member can be measured.

Next, a solid white image is printed on 5 sheets, and a current value at the time of image formation in a section excluding 3 seconds of pre-rotation and 1 second of post-rotation is measured with the charge transfer amount detection unit. The current value is sampled every 10 ms, and the maximum value and minimum value of the current value in the above-mentioned section are determined.

A difference between the maximum value and minimum value of the current value determined in the foregoing is calculated under each of the following two environments: a high-temperature and high-humidity environment having a temperature of 32.5° C. and a humidity of 80%; and a low-temperature and low-humidity environment having a temperature of 15° C. and a humidity of 10%. The larger value of the current value differences obtained under the two environments is defined as $I_{min}$.

The minimum detectable charge transfer amount $I_{min}$ per unit time in the electrophotographic apparatus X was measured using the above-mentioned method, and as a result, $I_{min}$ was found to be 1.4 μA. The difference between the maximum value and minimum value of the current value obtained under the high-temperature and high-humidity environment was 1.2 μA, and the difference between the maximum value and minimum value of the current value obtained under the low-temperature and low-humidity environment was 1.4 μA.

Next, an absolute value $V_{min}$ of the minimum detectable potential difference was calculated from the measured $I_{min}$ by the following method. A specific procedure of the $V_{min}$ measurement method is described below.

First, the charging high-voltage contact point B of the main body of the above-mentioned electrophotographic apparatus X is insulated. An external power source (TREK 615-3-L) is prepared, and the external power source and the contact point A are connected via the charge transfer amount detection unit. The external power source is interlocked with a motor for driving the process cartridge so as to apply a voltage simultaneously with the driving of the motor, and to stop the application of the voltage simultaneously with the stopping of the motor.

Next, a solid white image is printed on 5 sheets, and a current value at the time of image formation in a section excluding 3 seconds of pre-rotation and 1 second of post-rotation is measured. An applied voltage $V_a$ of the external power source is set to −800 V, the current value is sampled every 10 ms, and an average value $I_a$ of the current value in the above-mentioned section is calculated. The setting of the external power source is changed to −1,200 V ($V_b$), and an average value $I_b$ of the current value in the above-mentioned section is similarly calculated.

Measurement was performed for the electrophotographic apparatus 1 under the above-mentioned conditions, and the results were as follows: $I_a$=20.9 μA and $I_b$=65.7 μA.

Next, the slope of a straight line obtained by plotting voltage versus current from $V_a$, $V_b$, $I_a$, and $I_b$ was determined, and $V_{min}$ was calculated.

$$\begin{aligned} V_{min} &= |I_{min} \times (V_a - V_b)/(I_a - I_b)| \\ &= |-1.4 \times 400/44.8| \\ &= 12.5 V \end{aligned}$$

Thus, the absolute value $V_{min}$ of the minimum detectable potential difference was calculated to be 12.5 V.

[Evaluation 2]

Based on the above-mentioned equation (E-2) for calculating $V_1$ and equation (E-3) for calculating $V_2$, $V_1$ and $V_2$ were estimated from the characteristics (A, "m", and τ) of the electrophotographic photosensitive member 1 analyzed in [Evaluation 1] and the value of $V_{min}$ calculated in the foregoing. The results were as shown in Table 2, i.e., $V_1$=16.8 (V) and $V_2$=8,105 (V).

Thus, it was found that the electrophotographic apparatus 1 satisfied the following inequality (E-4).

$$100V_1 < V_2 - V_1 \quad \text{(E-4)}$$

In Evaluation 2, a case in which the inequality (E-4) was satisfied was graded A, and a case in which the inequality was not satisfied was graded B.

[Evaluation 3]

Based on the above-mentioned equation (E-2) for calculating $V_1$ and equation (E-11) for calculating $V_2'$, $V_1$ and $V_2'$ were estimated from the characteristics (A, "m", and τ) of the electrophotographic photosensitive member 1 analyzed in [Evaluation 1] and the value of $V_{min}$ calculated in the foregoing. The results were as shown in Table 2, i.e., $V_1$=16.8 (V) and $V_2'$=5,237 (V).

Thus, it was found that the electrophotographic apparatus 1 satisfied the following inequality (E-12).

$$100V_1 < V_2' - V_1 \quad \text{(E-12)}$$

In Evaluation 3, a case in which the inequality (E-12) was satisfied was graded A, and a case in which the inequality was not satisfied was graded B.

[Evaluation 4]

In the electrophotographic apparatus 1, the control of the charging potential was performed based on the following control method 1. The control target value of the charging potential was set to $V_{td}$=−500 V, and accuracy Acc1 of the control was calculated based on the following equation (E-20) through use of an absolute value $V_{d1}$ of the charging potential obtained after the control.

$$Acc1 = 100 \times |V_{d1} - 500|/500 \quad \text{(E-20)}$$

[Control Method 1]

(1) A sequence is started under a state in which the charging potential is 0 V.

(2) A main motor is driven.

(3) A developing bias is applied.

(4) Exposure.

(5) VA=−800 (V) is applied to the charging roller, and current values per rotation of the electrophotographic photosensitive member are averaged.

(6) VB=−3,000 (V) is applied to the charging roller, and current values per rotation of the electrophotographic photosensitive member are averaged.

(7) A relationship between the applied voltages and the current values at the two points of (5) and (6) is approximated by a straight line to calculate the discharge start voltage $V_{th}$.

(8) The control DC voltage $V_{DC1}$ is calculated from the discharge start voltage $V_{th}$ calculated in (7) and the control target value, $V_{tD}$=−500 V, of the charging potential through use of the above-mentioned equation (E-15).

(9) The main motor, the developing bias, and the exposure are stopped.

(10) The sequence is ended.

The absolute value of the charging potential in the above-mentioned control (5) was $V_{dm}$=269 (V), and the absolute value of the charging potential in the above-mentioned control (6) was $V_{dM}$=2,469 (V). Meanwhile, according to [Evaluation 2] and [Evaluation 3], $V_1$, $V_2$, and $V_2'$ of the electrophotographic photosensitive member 1 are $V_1$=16.8 (V), $V_2$=8,105 (V), and $V_2'$=5,237 (V), respectively. Thus, it was found that the electrophotographic apparatus 1 satisfied the following inequality (E-18) and the following inequality (E-19).

$$V_1<V_{dm}<V_{dM}\leq V_2 \quad \text{(E-18)}$$

$$V_1<V_{dm}<V_{dM}\leq V_2' \quad \text{(E-19)}$$

In Evaluation 4, for each of the inequality (E-18) and the inequality (E-19), a case in which the inequality was satisfied was graded A, and a case in which the inequality was not satisfied was graded B.

The estimated discharge start voltage $V_{th}$ calculated from the values obtained in the above-mentioned controls (5) and (6) was −527 V. Accordingly, the control DC voltage $V_{DC1}$ obtained in the above-mentioned control (8) was −527 (V)+(−500 (V))=−1,027 V. The thus obtained control DC voltage $V_{DC}$ was used to charge the electrophotographic photosensitive member 1 in the electrophotographic apparatus 1, and as a result, a charging potential of −496 V was obtained.

Accordingly, Acc1 was as follows: Acc1=100×|496−500|/500=0.8(%).

The above-mentioned control method 1 was performed for the electrophotographic apparatus 1, and as a result, the time period required for the control was 1.5 seconds.

Example 2

Control was performed in the same manner as in Example 1 except that in Example 1, the charging potential was controlled using the following control method 2 in place of the control method 1 as the control method to be performed in Evaluation 4.

[Control Method 2]

(1) A sequence is started under a state in which the charging potential is 0 V.

(2) A main motor is driven.

(3) A developing bias is applied.

(4) Exposure.

(5) VA=−800 (V) is applied to the charging roller, and current values per rotation of the electrophotographic photosensitive member are averaged.

(6) VC=−1,350 (V) is applied to the charging roller, and current values per rotation of the electrophotographic photosensitive member are averaged.

(7) A relationship between the applied voltages and the current values at the two points of (5) and (6) is approximated by a straight line to calculate the discharge start voltage $V_{th}$.

(8) The control DC voltage $V_{DC2}$ is calculated from the discharge start voltage $V_{th}$ calculated in (7) and the control target value, $V_{td}$=−500 V, of the charging potential through use of the above-mentioned equation (E-15).

(9) The main motor, the developing bias, and the exposure are stopped.

(10) The sequence is ended.

The absolute value of the charging potential in the above-mentioned control (5) was $V_{dm}$=269 (V), and the absolute value of the charging potential in the above-mentioned control (6) was $V_{dM}$=819 (V). Meanwhile, according to [Evaluation 2] and [Evaluation 3], $V_1$, $V_2$, and $V_2'$ of the electrophotographic photosensitive member 1 are $V_1$=16.8 (V), $V_2$=8,105 (V), and $V_2'$=5,237 (V), respectively. Thus, it was found that the electrophotographic apparatus 1 satisfied the above-mentioned inequality (E-18) and the above-mentioned inequality (E-19).

The estimated discharge start voltage $V_{th}$ calculated from the values obtained in the above-mentioned controls (5) and (6) was −528 V. Accordingly, the control DC voltage $V_{DC1}$ obtained in the above-mentioned control (8) was −528 (V)+(−500 (V))=−1,028 V. The thus obtained control DC voltage $V_{DC1}$ was used to charge the electrophotographic photosensitive member 1 in the electrophotographic apparatus 1, and as a result, a charging potential of −497 V was obtained.

Accordingly, Acc1 was as follows: Acc1=100×|497−500|/500=0.6(%).

The above-mentioned control method 2 was performed for the electrophotographic apparatus 1, and as a result, the time period required for the control was 1.5 seconds.

Example 3

Control was performed in the same manner as in Example 1 except that in Example 1, the charging potential was controlled using the following control method 3 in place of the control method 1 as the control method to be performed in Evaluation 4.

[Control Method 3]

(1) A sequence is started under a state in which the charging potential is 0 V.

(2) A main motor is driven.

(3) A developing bias is applied.

(4) Exposure.

(5) VA=−800 (V) is applied to the charging roller, and current values per rotation of a drum are averaged.

(6) VC=−1,350 (V) is applied to the charging roller, and current values per rotation of the drum are averaged.

(7) VE=−1,800 (V) is applied to the charging roller, and current values per rotation of the drum are averaged.

(8) A relationship between the applied voltages and the current values at the three points of (5), (6), and (7) is approximated by a quadric function to calculate the discharge start voltage $V_{th}$.

(9) The control DC voltage $V_{DC3}$ is calculated from the discharge start voltage $V_{th}$ calculated in (8) and the control target value, $V_{td}$=−500 V, of the charging potential through use of the above-mentioned equation (E-15).

(10) The main motor, the developing bias, and the exposure are stopped.

(11) The sequence is ended.

The absolute value of the charging potential in the above-mentioned control (5) was $V_{dm}$=269 (V), and the absolute value of the charging potential in the above-mentioned control (7) was $V_{dM}$=1,269 (V). Meanwhile, according to [Evaluation 2] and [Evaluation 3], $V_1$, $V_2$, and $V_2'$ of the electrophotographic photosensitive member 1 are $V_1$=16.8 (V), $V_2$=8,105 (V), and $V_2'$=5,237 (V), respectively. Thus, it was found that Example 3 satisfied the above-mentioned inequality (E-18) and the above-mentioned inequality (E-19).

The estimated discharge start voltage $V_{th}$ calculated from the values obtained in the above-mentioned controls (5), (6), and (7) was −528 V. Accordingly, the control DC voltage $V_{DC1}$ obtained in the above-mentioned control (8) was −528 (V)+(−500 (V))=−1,028 V. The thus obtained control DC voltage $V_{DC1}$ was used to charge the electrophotographic photosensitive member 1 in the electrophotographic apparatus 1, and as a result, a charging potential of −497 V was obtained.

Accordingly, Acc1 was as follows: Acc1=100×|497−500|/500=0.6(%).

The above-mentioned control method 3 was performed for the electrophotographic photosensitive member 1, and as a result, the time period required for the control was 1.8 seconds.

Examples 4 to 30 and Comparative Examples 1 to 11

Evaluations were performed in the same manner as in Example 1 except that the kind of the electrophotographic photosensitive member to be mounted onto the electrophotographic apparatus X and the control method for charging potential control were changed as shown in Table 2.

TABLE 2

| Example/ Comparative Example | Electro-photographic photo sensitive member No. | Evaluation 1 A | Evaluation 1 m × $10^{-2}$ | Evaluation 1 T × $10^3$ | Evaluation 2 $V_1$ (V) | Evaluation 2 $V_2$ (V) | Evaluation 2 Grade | Evaluation 3 $V_1$ (V) | Evaluation 3 $V_2'$ (V) | Evaluation 3 Grade |
|---|---|---|---|---|---|---|---|---|---|---|
| Example 1 | 1 | 4.1 | 0.7 | 6.7 | 16.8 | 8,105 | A | 16.8 | 5,237 | A |
| Example 2 | 1 | 4.1 | 0.7 | 6.7 | 16.8 | 8,105 | A | 16.8 | 5,237 | A |
| Example 3 | 1 | 4.1 | 0.7 | 6.7 | 16.8 | 8,105 | A | 16.8 | 5,237 | A |
| Example 4 | 2 | 4.0 | 0.6 | 7.0 | 16.6 | 9,177 | A | 16.6 | 5,909 | A |
| Example 5 | 3 | 4.0 | 2.0 | 6.6 | 16.8 | 4,887 | A | 16.8 | 3,155 | A |
| Example 6 | 4 | 4.0 | 1.9 | 6.6 | 16.8 | 4,930 | A | 16.8 | 3,182 | A |
| Example 7 | 5 | 4.0 | 1.9 | 6.7 | 16.8 | 5,072 | A | 16.8 | 3,273 | A |
| Example 8 | 6 | 6.0 | 2.2 | 6.8 | 18.9 | 4,794 | A | 18.9 | 3,218 | A |
| Example 9 | 7 | 6.0 | 1.9 | 6.7 | 18.8 | 5,110 | A | 18.8 | 3,428 | A |
| Example 10 | 8 | 6.0 | 1.2 | 4.3 | 18.7 | 5,222 | A | 18.7 | 3,503 | A |
| Example 11 | 9 | 4.2 | 1.0 | 6.7 | 16.9 | 6,803 | A | 16.9 | 4,403 | A |
| Example 12 | 10 | 4.2 | 1.0 | 6.8 | 16.8 | 7,187 | A | 16.8 | 4,650 | A |
| Example 13 | 11 | 5.0 | 1.1 | 4.9 | 17.7 | 5,876 | A | 17.7 | 3,868 | A |
| Example 14 | 12 | 5.8 | 1.2 | 4.3 | 18.5 | 5,352 | A | 18.5 | 3,577 | A |
| Example 15 | 13 | 4.6 | 2.9 | 5.4 | 17.6 | 3,647 | A | 17.6 | 2,389 | A |
| Example 16 | 13 | 4.6 | 2.9 | 5.4 | 17.6 | 3,647 | A | 17.6 | 2,389 | A |
| Example 17 | 13 | 4.6 | 2.9 | 5.4 | 17.6 | 3,647 | A | 17.6 | 2,389 | A |
| Example 18 | 14 | 4.7 | 3.3 | 4.9 | 17.7 | 3,306 | A | 17.7 | 2,172 | A |
| Example 19 | 15 | 4.8 | 3.7 | 4.4 | 17.9 | 2,965 | A | 17.9 | 1,954 | A |
| Example 20 | 15 | 4.8 | 3.7 | 4.4 | 17.9 | 2,965 | A | 17.9 | 1,954 | A |
| Example 21 | 15 | 4.8 | 3.7 | 4.4 | 17.9 | 2,965 | A | 17.9 | 1,954 | A |
| Example 22 | 16 | 4.0 | 1.1 | 6.7 | 16.7 | 6,685 | A | 16.7 | 4,309 | A |
| Example 23 | 17 | 4.1 | 1.2 | 6.5 | 16.8 | 6,295 | A | 16.8 | 4,067 | A |
| Example 24 | 18 | 4.1 | 1.3 | 6.3 | 16.8 | 5,853 | A | 16.8 | 3,783 | A |
| Example 25 | 19 | 4.2 | 1.5 | 6.3 | 16.9 | 5,575 | A | 16.9 | 3,611 | A |
| Example 26 | 20 | 4.4 | 1.8 | 5.9 | 17.2 | 4,943 | A | 17.2 | 3,218 | A |
| Example 27 | 21 | 7.8 | 3.7 | 4.5 | 21.0 | 3,112 | A | 21.0 | 2,159 | A |
| Example 28 | 22 | 8.0 | 6.0 | 4.0 | 21.6 | 2,318 | A | 21.6 | 1,620 | B |
| Example 29 | 22 | 8.0 | 6.0 | 4.0 | 21.6 | 2,318 | A | 21.6 | 1,620 | B |
| Example 30 | 22 | 8.0 | 6.0 | 4.0 | 21.6 | 2,318 | A | 21.6 | 1,620 | B |
| Comparative Example 1 | 23 | 42.0 | 23.5 | 0.8 | 61.4 | 912 | B | 61.4 | 810 | B |
| Comparative Example 2 | 23 | 42.0 | 23.5 | 0.8 | 61.4 | 912 | B | 61.4 | 810 | B |
| Comparative Example 3 | 23 | 42.0 | 23.5 | 0.8 | 61.4 | 912 | B | 61.4 | 810 | B |
| Comparative Example 4 | 24 | 55.0 | 28.6 | 0.7 | 78.0 | 895 | B | 78.0 | 820 | B |
| Comparative Example 5 | 25 | 65.0 | 38.2 | 0.7 | 94.3 | 812 | B | 94.3 | 760 | B |
| Comparative Example 6 | 26 | 63.0 | 18.3 | 0.9 | 84.1 | 1,231 | B | 84.1 | 1,129 | B |
| Comparative Example 7 | 27 | 67.0 | 20.8 | 0.9 | 89.8 | 1,173 | B | 89.8 | 1,084 | B |
| Comparative Example 8 | 28 | 73.0 | 23.5 | 0.9 | 98.1 | 1,131 | B | 98.1 | 1,055 | B |
| Comparative Example 9 | 29 | 83.0 | 28.0 | 0.9 | 112.6 | 1,081 | B | 112.6 | 1,021 | B |
| Comparative Example 10 | 29 | 83.0 | 28.0 | 0.9 | 112.6 | 1,081 | B | 112.6 | 1,021 | B |
| Comparative Example 11 | 29 | 83.0 | 28.0 | 0.9 | 112.6 | 1,081 | B | 112.6 | 1,021 | B |

TABLE 2-continued

| | Evaluation 4 | | | | | | | |
|---|---|---|---|---|---|---|---|---|
| Example/ Comparative Example | Control method | $V_{dm}$ (V) | $V_{dM}$ (V) | Grade: inequality ( E-18) | Grade: inequality (E-19) | Time required for control (sec) | Estimated discharge start voltage (−V) | Acc 1 (%) |
| Example 1 | 1 | 269 | 2,469 | A | A | 1.5 | 527 | 0.8 |
| Example 2 | 2 | 269 | 819 | A | A | 1.5 | 528 | 0.6 |
| Example 3 | 3 | 269 | 1,269 | A | A | 1.8 | 528 | 0.6 |
| Example 4 | 1 | 269 | 2,469 | A | A | 1.5 | 528 | 0.6 |
| Example 5 | 1 | 269 | 2,469 | A | A | 1.5 | 514 | 3.4 |
| Example 6 | 1 | 269 | 2,469 | A | A | 1.5 | 516 | 3.0 |
| Example 7 | 1 | 243 | 2,443 | A | A | 1.5 | 544 | 2.6 |
| Example 8 | 1 | 243 | 2,443 | A | A | 1.5 | 536 | 4.2 |
| Example 9 | 1 | 243 | 2,443 | A | A | 1.5 | 538 | 3.8 |
| Example 10 | 1 | 269 | 2,469 | A | A | 1.5 | 520 | 2.2 |
| Example 11 | 1 | 269 | 2,469 | A | A | 1.5 | 526 | 1.0 |
| Example 12 | 1 | 269 | 2,469 | A | A | 1.5 | 527 | 0.8 |
| Example 13 | 1 | 269 | 2,469 | A | A | 1.5 | 522 | 1.8 |
| Example 14 | 1 | 269 | 2,469 | A | A | 1.5 | 520 | 2.2 |
| Example 15 | 1 | 269 | 2,469 | A | B | 1.5 | 509 | 4.4 |
| Example 16 | 2 | 269 | 819 | A | A | 1.5 | 520 | 2.2 |
| Example 17 | 3 | 269 | 1,269 | A | A | 1.8 | 518 | 2.6 |
| Example 18 | 1 | 269 | 2,469 | A | B | 1.5 | 508 | 4.6 |
| Example 19 | 1 | 269 | 2,469 | A | B | 1.5 | 506 | 5.0 |
| Example 20 | 2 | 269 | 819 | A | A | 1.5 | 515 | 3.0 |
| Example 21 | 3 | 269 | 1,269 | A | A | 1.8 | 516 | 3.4 |
| Example 22 | 1 | 269 | 2,469 | A | A | 1.5 | 525 | 1.2 |
| Example 23 | 1 | 269 | 2,469 | A | A | 1.5 | 524 | 1.4 |
| Example 24 | 1 | 269 | 2,469 | A | A | 1.5 | 522 | 1.8 |
| Example 25 | 1 | 269 | 2,469 | A | A | 1.5 | 520 | 2.2 |
| Example 26 | 1 | 269 | 2,469 | A | A | 1.5 | 521 | 2.0 |
| Example 27 | 1 | 269 | 2,469 | A | B | 1.5 | 507 | 4.8 |
| Example 28 | 1 | 269 | 2,469 | B | B | 1.5 | 499 | 6.4 |
| Example 29 | 2 | 269 | 819 | A | A | 1.5 | 506 | 5.0 |
| Example 30 | 3 | 269 | 1,269 | A | A | 1.8 | 505 | 5.2 |
| Comparative Example 1 | 1 | 220 | 2,420 | B | B | 1.5 | 485 | 19.0 |
| Comparative Example 2 | 2 | 220 | 770 | A | A | 1.5 | 495 | 16.6 |
| Comparative Example 3 | 3 | 220 | 1,220 | B | B | 1.8 | 497 | 17.0 |
| Comparative Example 4 | 1 | 204 | 2,404 | B | B | 1.5 | 496 | 20.0 |
| Comparative Example 5 | 1 | 190 | 2,390 | B | B | 1.5 | 495 | 23.0 |
| Comparative Example 6 | 1 | 243 | 2,443 | B | B | 1.5 | 459 | 19.6 |
| Comparative Example 7 | 1 | 220 | 2,420 | B | B | 1.5 | 480 | 20.0 |
| Comparative Example 8 | 1 | 197 | 2,397 | B | B | 1.5 | 491 | 22.4 |
| Comparative Example 9 | 1 | 182 | 2,382 | B | B | 1.5 | 488 | 26.0 |
| Comparative Example 10 | 2 | 182 | 732 | A | A | 1.5 | 508 | 21.2 |
| Comparative Example 11 | 3 | 182 | 1,182 | B | B | 1.8 | 512 | 22.0 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-036569, filed Mar. 9, 2022 which is hereby incorporated by reference herein in its entirety.

What is claimed is:

1. An electrophotographic apparatus comprising:

an electrophotographic photosensitive member;

a voltage application unit configured to cause discharge from an electroconductive member to the electrophotographic photosensitive member;

a charge transfer amount detection unit configured to detect a charge transfer amount per unit time resulting from the discharge from the electroconductive member to the electrophotographic photosensitive member; and a charging potential control unit configured to control a charging potential of the electrophotographic photosensitive member, wherein when $V_1$ and $V_2$ are defined by the following procedures (1) to (8) for the electrophotographic photosensitive member, the $V_1$ and the $V_2$ satisfy a relationship represented by the following expression (E-4):

$$100V_1<V_2-V_1 \quad \text{(E-4), and}$$

wherein the charging potential control unit is configured to control the charging potential of the electrophotographic photosensitive member at a time of image formation from a relationship between DC voltages at at least two points selected from a range in which an absolute value of a DC voltage applied by the voltage application unit is 700 V or more, and charge transfer amounts at the DC voltages at the at least two points:

(1) the electrophotographic photosensitive member is charged for 0.005 second;

(2) an absolute value of the charging potential obtained through measurement after 0.06 second from start of the charging in (1) is represented by $V_d$ [V];

(3) the electrophotographic photosensitive member is charged for 0.005 second so that the absolute value of the charging potential becomes the $V_d$ again after 0.18 second from the start of the charging in (1);

(4) exposure is performed with light having a wavelength of 805 nm and a light amount of 0.5 μJ/cm$^2$ after 0.02 second from start of the charging in (3);

(5) the absolute value of the charging potential obtained through measurement after 0.06 second from the start of the charging in (3) is defined as a residual potential $V_r$ [V];

(6) while the $V_d$ is changed from 100 V to 1,000 V at intervals of 50 V, the procedures (1) to (5) are repeatedly performed to measure the $V_r$ corresponding to each value of the $V_d$;

(7) a graph obtained by plotting the $V_d$ and the $V_r$ obtained in (6) with a horizontal axis representing the $V_d$ and a vertical axis representing the $V_r$ is approximated by the following equation (E-1) to determine constants A, "m", and τ in the following equation (E-1):

$$V_r = A + 1000m\frac{1-e^{\frac{V_d}{\tau}}}{1-e^{\frac{1000}{\tau}}}; \qquad \text{(E-1)}$$

and (8) voltages calculated by the following equations (E-2) and (E-3) through use of the constants A, "m", and τ determined in (7) are defined as the $V_1$ and the $V_2$, respectively:

$$V_1 = \frac{-\left(1+1000\,m/\tau\left(1-e^{1000/\tau}\right)\right) + \sqrt{\left(1+1000m/\tau\left(1-e^{1000/\tau}\right)\right)^2 + 2000m(V_{min}+A)/\tau^2\left(1-e^{1000/\tau}\right)}}{1000m/\tau^2\left(1-e^{1000/\tau}\right)} \qquad \text{(E-2)}$$

in the equation (E-2), $V_{min}$ represents a numerical value determined by accuracy of the charge transfer amount detection unit.

$$V_2 = \begin{cases} -30\times\dfrac{1-\sqrt{\left(1-2\left(1+\frac{\tau}{30}\right)\right)\left[1+\frac{\tau\left(1-e^{\frac{1000}{\tau}}\right)}{1000m}+\frac{\tau\left(1-e^{\frac{1000}{\tau}}\right)}{1000m}\cdot\frac{A}{30}\right]}}{1+30/\tau} & (\tau>0) \\ 30\times\dfrac{1+\sqrt{\left(1-2\left(1-\frac{\tau}{30}\right)\right)\left[1+\frac{\tau\left(1-e^{\frac{1000}{\tau}}\right)}{1000m}+\frac{\tau\left(1-e^{\frac{1000}{\tau}}\right)}{1000m}\cdot\frac{A}{30}\right]}}{1-30/\tau} & (\tau<0) \end{cases}. \qquad \text{(E-3)}$$

2. The electrophotographic apparatus according to claim 1, wherein when a voltage calculated from the constants A, "m", and τ by the following equation (E-12) is represented by $V_2'$, $$V_2' = \begin{cases} -10\times\dfrac{1-\sqrt{\left(1-2\left(1+\frac{\tau}{10}\right)\right)\left[1+\frac{\tau\left(1-e^{\frac{1000}{\tau}}\right)}{1000m}+\frac{\tau\left(1-e^{\frac{1000}{\tau}}\right)}{1000m}\cdot\frac{A}{10}\right]}}{1+10/\tau} & (\tau>0) \\ 10\times\dfrac{1-\sqrt{\left(1-2\left(1-\frac{\tau}{10}\right)\right)\left[1+\frac{\tau\left(1-e^{\frac{1000}{\tau}}\right)}{1000m}-\frac{\tau\left(1-e^{\frac{1000}{\tau}}\right)}{1000m}\cdot\frac{A}{10}\right]}}{1-10/\tau} & (\tau<0) \end{cases} \qquad \text{(E-12)}$$

the $V_1$ and the $V_2'$ satisfy a relationship of the following expression (E-13):

$$100V_1 < V_2' - V_1 \qquad \text{(E-13).}$$

3. The electrophotographic apparatus according to claim 1, wherein the voltage application unit is a charging unit configured to charge the electrophotographic photosensitive member, and wherein the electroconductive member is a charging member.

4. The electrophotographic apparatus according to claim 3, wherein the charging member is a charging roller.

5. The electrophotographic apparatus according to claim 1, wherein the voltage application unit is a transfer unit configured to transfer toner from a surface of the electrophotographic photosensitive member onto a transfer material, and wherein the electroconductive member is a transfer member.

6. The electrophotographic apparatus according to claim 1, wherein the charging potential control unit is configured to control the DC voltage to be applied at the time of image formation from the relationship between the DC voltages at the at least two points and the charge transfer amounts at the DC voltages at the at least two points.

7. The electrophotographic apparatus according to claim 1, wherein the charging potential control unit is configured to: approximate a relationship between DC voltages at "n" points selected from the range in which the absolute value of the DC voltage applied by the voltage application unit is 700 V or more, and charge transfer amounts at the DC voltages at the "n" points, by a function having a degree of freedom of "n" or less, where "n" represents an integer of 2 or more; and control the charging potential of the electrophotographic photosensitive member at the time of image formation by using the function as a calibration curve.

8. The electrophotographic apparatus according to claim 7, wherein the function is a linear function.

9. The electrophotographic apparatus according to claim 1, wherein the constant A is 15 or less.

10. The electrophotographic apparatus according to claim 1, wherein the constant "m" is 0.05 or less.

11. The electrophotographic apparatus according to claim 1, wherein the constant τ has an absolute value of 4,000 or more.

12. The electrophotographic apparatus according to claim 1, wherein the electrophotographic photosensitive member includes a support, an undercoat layer, a charge generating layer, and a charge transporting layer in the stated order, and wherein the undercoat layer contains a polyamide resin and a metal oxide particle.

13. The electrophotographic apparatus according to claim 12, wherein the metal oxide particle is a titanium oxide particle, and wherein the titanium oxide particle has an average primary particle diameter of 10 to 100 nm.

14. The electrophotographic apparatus according to claim 12, wherein the undercoat layer has a thickness of 0.5 to 3.0 μm.

15. The electrophotographic apparatus according to claim 12, wherein the charge generating layer contains a titanyl phthalocyanine pigment, wherein the titanyl phthalocyanine pigment includes a crystal particle which has a crystal form showing peaks at Bragg angles 2θ of 9.8°±0.3° and 27.1°±0.3° in an X-ray diffraction spectrum using a CuKα ray, and has a peak A in a range of from 50 to 150 nm in a crystal particle size distribution measured using small-angle X-ray scattering, and wherein the peak A has a half width of 100 nm or less.

16. The electrophotographic apparatus according to claim 12, wherein the charge generating layer contains a hydroxygallium phthalocyanine pigment, wherein the hydroxygallium phthalocyanine pigment includes a crystal particle which has a crystal form showing peaks at Bragg angles 2θ of 7.4°±0.3° and 28.2°±0.3° in an X-ray diffraction spectrum using a CuKα ray, and has a peak B in a range of from 20 to 50 nm in a crystal particle size distribution measured using small-angle X-ray scattering, and wherein the peak B has a half width of 50 nm or less.

17. The electrophotographic apparatus according to claim 12, wherein the charge generating layer has a thickness of 0.12 μm or more.

* * * * *